(12) United States Patent
Nakayama et al.

(10) Patent No.: US 12,232,154 B2
(45) Date of Patent: Feb. 18, 2025

(54) PROVIDE A WIRELESS LOCAL AREA NETWORK (LAN) SYSTEM, AN INTERFERENCE CONTROL SIGNAL MANAGEMENT DEVICE WHICH ARE CAPABLE OF LIMITING INTERFERENCE

(71) Applicant: NIPPON TELEGRAPH AND TELEPHONE CORPORATION, Tokyo (JP)

(72) Inventors: Shota Nakayama, Musashino (JP); Kenichi Kawamura, Musashino (JP); Takatsune Moriyama, Musashino (JP); Keisuke Wakao, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 343 days.

(21) Appl. No.: 17/776,440

(22) PCT Filed: Nov. 26, 2019

(86) PCT No.: PCT/JP2019/046173
§ 371 (c)(1),
(2) Date: May 12, 2022

(87) PCT Pub. No.: WO2021/106078
PCT Pub. Date: Jun. 3, 2021

(65) Prior Publication Data
US 2022/0408453 A1  Dec. 22, 2022

(51) Int. Cl.
*H04W 72/12* (2023.01)
*H04W 24/08* (2009.01)
(Continued)

(52) U.S. Cl.
CPC ........... *H04W 72/54* (2023.01); *H04W 24/08* (2013.01); *H04W 72/1263* (2013.01); *H04W 84/12* (2013.01)

(58) Field of Classification Search
CPC . H04W 72/54; H04W 24/08; H04W 72/1263; H04W 84/12; H04W 36/0094;
(Continued)

(56) References Cited

U.S. PATENT DOCUMENTS

2005/0058151 A1\* 3/2005 Yeh ........................ H04W 52/46
370/445
2006/0252418 A1\* 11/2006 Quinn ................... H04W 16/10
455/423

(Continued)

FOREIGN PATENT DOCUMENTS

EP        2273813 A2 \*  1/2011 ............ H04W 16/14

OTHER PUBLICATIONS

"IEEE Approved Draft Standard for Information technology—Telecommunications and information exchange between systems—Local and metropolitan area networks—Specific requirements Part 11: Wireless LAN Medium Access Control (MAC) and Physical Layer (PHY) Specifications", IEEE P802.11-REVmc/D8.0, Aug. 2016.

*Primary Examiner* — Mewale A Ambaye

(57) ABSTRACT

A wireless LAN system where an interfering communication device is present around a base station device and a terminal device includes an interference control signal transmitter that transmits an interference control signal that causes the interfering communication device to wait for transmission, and an interference control signal management device that collects wireless environment information, sets wireless LAN communication between the base station device and the terminal device, which are protection targets, as protected communication, and causes the interference control
(Continued)

signal transmitter to transmit an interference control signal that causes the interfering communication device to wait for transmission, and the interference control signal management device instructs the interference control signal transmitter to start transmitting the interference control signal when detecting a start of the protected communication and instructs the interference control signal transmitter to stop transmitting the interference control signal when detecting a stop of the protected communication.

6 Claims, 16 Drawing Sheets

(51) Int. Cl.
*H04W 72/1263* (2023.01)
*H04W 72/54* (2023.01)
*H04W 84/12* (2009.01)

(58) Field of Classification Search
CPC ............... H04W 16/18; H04W 72/566; H04W 74/0816; H04W 16/14; H04L 41/145; H04L 43/00
See application file for complete search history.

(56) References Cited

U.S. PATENT DOCUMENTS

| | | | |
|---|---|---|---|
| 2009/0296591 A1* | 12/2009 | Urabe | H04W 74/0808 370/252 |
| 2010/0087221 A1* | 4/2010 | Srinivasan | H04W 16/08 455/63.1 |
| 2015/0289142 A1* | 10/2015 | Abeysekera | H04W 72/0453 370/338 |
| 2016/0119806 A1* | 4/2016 | Carbajal | H04B 17/318 455/67.11 |
| 2016/0233989 A1* | 8/2016 | Belghoul | H04L 5/001 |

* cited by examiner

PROVIDE A WIRELESS LOCAL AREA NETWORK (LAN) SYSTEM, AN INTERFERENCE CONTROL SIGNAL MANAGEMENT DEVICE WHICH ARE CAPABLE OF LIMITING INTERFERENCE

CROSS-REFERENCE TO RELATED APPLICATIONS

This application is a 371 U.S. National Phase of International Application No. PCT/JP2019/046173, filed on Nov. 26, 2019. The entire disclosure of the above application is incorporated herein by reference.

TECHNICAL FIELD

The present disclosure relates to a wireless LAN system, an interference control signal management device, a base station device, and an interference control method that guarantee a low delay and a low jitter of a wireless LAN terminal against the co-channel interference.

BACKGROUND ART

With the popularization of 5G (fifth generation mobile communication system), demands for high quality wireless access have increased. For this reason, as one of the wireless access means, wireless LANs using a frequency band not requiring a license such as a 2.4 GHz band and a 5 GHz band have been widely used.

Regarding wireless LANs, specifications (NPL 1) are established by the Institute of Electrical and Electronics Engineers (IEEE), and carrier sense multiple access with collision avoidance (CSMA/CA) has been used for a wireless access scheme. In CSMA/CA, a wireless LAN terminal performs carrier sensing before transmission, confirms that a channel has not been used for a certain period of time, and then starts transmission. In a case where a channel is used, the wireless LAN terminal waits until the use of the channel ends, waits for transmission for the number of slots randomly selected in addition to a predetermined period of time, and transmits a wireless frame when a channel is not used in the meantime. In this manner, a plurality of wireless LAN terminals autonomously perform wireless communication while avoiding a collision of the wireless frame.

However, in the CSMA/CA, there is a hidden terminal problem in that wireless frames transmitted by terminals which cannot be detected even performing mutually carrier sensing collide. As a countermeasure for the hidden terminal problem, a technique for avoiding a collision using request to send (RTS) and clear to send (CTS) signals is used. In this technique, a transmission device transmits an RTS before transmission, and a reception device transmits a CTS upon receiving the RTS. The transmission device confirms communication with the reception device by the reception of the CTS and then transmits the actual data frame. In a duration field of each of the frames of the RTS and the CTS, a period of time required for transmitting the data frame to be transmitted is written, and a wireless LAN terminal having received the broadcast RTS and CTS waits the period of time written in the duration field (transmission waiting period: network allocation vector (NAV)) for transmission. In this manner, the transmission device can suppress transmission performed by a nearby transmission device and transmit a data frame, and thus can avoid a collision of a frame.

Here, one of the ways a CTS is used is called CTS-to-self. This is not the above-described RTS/CTS procedure, but a single CTS is transmitted alone. A CTS is transmitted to a device before transmission, and communication of wireless LAN devices other than the device is caused to wait, whereby it is possible to prevent a collision of a frame.

CITATION LIST

Non Patent Literature

NPL 1: P802.11-REVmc/D8.0, August 2016—IEEE Approved Draft Standard for Information technology—Telecommunications and information exchange between systems—Local and metropolitan area networks—Specific requirements Part 11: Wireless LAN Medium Access Control (MAC) and Physical Layer (PHY) Specifications

SUMMARY OF THE INVENTION

Technical Problem

In general, wireless LAN systems can secure stable quality in environments with a small number of terminals and less interference from surroundings. However, in a case where the number of terminals increases and interference from the surroundings increases, a delay, a jitter, and the like increase due to a collision of a wireless frame or frequent occurrence of transmission waiting, thereby degrading communication quality. In particular, this is a serious problem in an application such as voice over IP (VoIP) and a streaming video requiring real-time performance, and thus a wireless LAN system that achieve a low delay and a low jitter is required. On the other hand, fine control such as start or stop transmitting a CTS-to-self in response to the start or stop of data communication is not performed, and there is a problem in that communication efficiency is reduced.

An object of the present disclosure is to provide a wireless LAN system, an interference control signal management device, a base station device, and an interference control method which are capable of limiting the interference of nearby wireless LAN devices using the same channel and achieving a low delay and a low jitter without reducing communication efficiency.

Means for Solving the Problem

The present disclosure provides a wireless LAN system where an interfering communication device that interferes with wireless LAN communication is present around a base station device and a terminal device that perform the wireless LAN communication, the wireless LAN system including an interference control signal transmitter disposed around the base station device and the terminal device, that collects wireless environment information, and that transmits an interference control signal that causes the interfering communication device to wait for transmission, and an interference control signal management device that collects the wireless environment information from the base station device and the interference control signal transmitter, sets the wireless LAN communication between the base station device that is to be protected and the terminal device that is to be protected as protected communication based on the wireless environment information, determines the interference control signal transmitter around the interfering communication device that interferes with the protected communication, and causes the interference control signal transmitter that is determined to transmit the interference control signal that causes the interfering communication device to wait for transmission, in which the interference control signal management device instructs the interference control signal transmitter to start transmitting the interference control signal when detecting a start of the protected communication and instructs the interference control signal transmitter to stop transmitting the interference control signal when detecting a stop of the protected communication, and the base station device and the terminal device preferentially communicate with each other while the interfering communication device with the interference control signal received waits for transmission.

The present disclosure provides an interference control signal management device that causes an interference control signal transmitter to transmit an interference control signal that causes an interfering communication device, which is present around a base station device and a terminal device that perform wireless LAN communication and interferes with the wireless LAN communication, to wait for transmission, the interference control signal management device including a wireless environment information collecting unit that collects wireless environment information from the base station device and the interference control signal transmitter, a protection target setting unit that sets the wireless LAN communication between the base station device that is to be protected and the terminal device that is to be protected as protected communication based on the wireless environment information and determines the interference control signal transmitter around the interfering communication device that interferes with the protected communication, and a control unit that causes the interference control signal transmitter that is determined to transmit the interference control signal that causes the interfering communication device to wait for transmission, in which the control unit instructs the interference control signal transmitter to start transmitting the interference control signal when detecting a start of the protected communication and instructs the interference control signal transmitter to stop transmitting the interference control signal when detecting a stop of the protected communication.

The present disclosure provides a base station device that performs wireless LAN communication with a terminal device in a wireless environment where an interfering communication device that interferes with the wireless LAN communication is present, the base station device including a scheduling unit that transmits, from a wireless LAN communication unit, an interference control signal generated based on a scheduling policy received from an interference control signal management device, a monitoring unit that receives, from the interference control signal management device, information on protected communication that is to be protected from interference and monitors the wireless LAN communication to detect a start or an end of the protected communication, and an interference control signal control unit that notifies the scheduling unit and the interference control signal management device of the start or the end of the protected communication when the monitoring unit detects the start or the end of the protected communication, in which the scheduling unit starts transmitting the interference control signal to the terminal device as destination when receiving a notification indicating the start of the protected communication from the interference control signal control unit and stops transmitting the interference control signal when receiving a notification indicating the end of the protected communication from the interference control signal control unit.

The present disclosure provides an interference control method in a wireless LAN system including an interference control signal management device that causes an interference control signal transmitter to transmit an interference control signal that sets a transmission waiting period in an interfering communication device that is present around a base station device and a terminal device performing wireless LAN communication and interferes with the wireless LAN communication, the interference control method including, by the interference control signal transmitter disposed around the base station device and the terminal device, collecting wireless environment information and transmitting the wireless environment information that is collected to the interference control signal management device, by the interference control signal transmitter, transmitting an interference control signal that causes the interfering communication device to wait for transmission, by the interference control signal management device, collecting the wireless environment information from the base station device and the interference control signal transmitter, by the interference control signal management device, setting the wireless LAN communication between the base station device that is to be protected and the terminal device that is to be protected as protected communication based on the wireless environment information and determining the interference control signal transmitter around the interfering communication device that interferes with the protected communication, and, by the interference control signal management device, causing the interference control signal transmitter that is determined to transmit the interference control signal that causes the interfering communication device to wait for transmission, in which the causing includes instructing the interference control signal transmitter to start transmitting the interference control signal when a start of the protected communication is detected and instructing the interference control signal transmitter to stop transmitting the interference control signal when a stop of the protected communication is detected.

Effects of the Invention

A wireless LAN system, an interference control signal management device, a base station device, and an interference control method according to the present disclosure can limit interference of nearby wireless LAN devices using the same channel and achieve a low delay and a low jitter without reducing communication efficiency.

DESCRIPTION OF EMBODIMENTS

Hereinafter, embodiments of a wireless LAN system, an interference control signal management device, a base station device, and an interference control method according to the present disclosure will be described with reference to the drawings.

Figure 1:
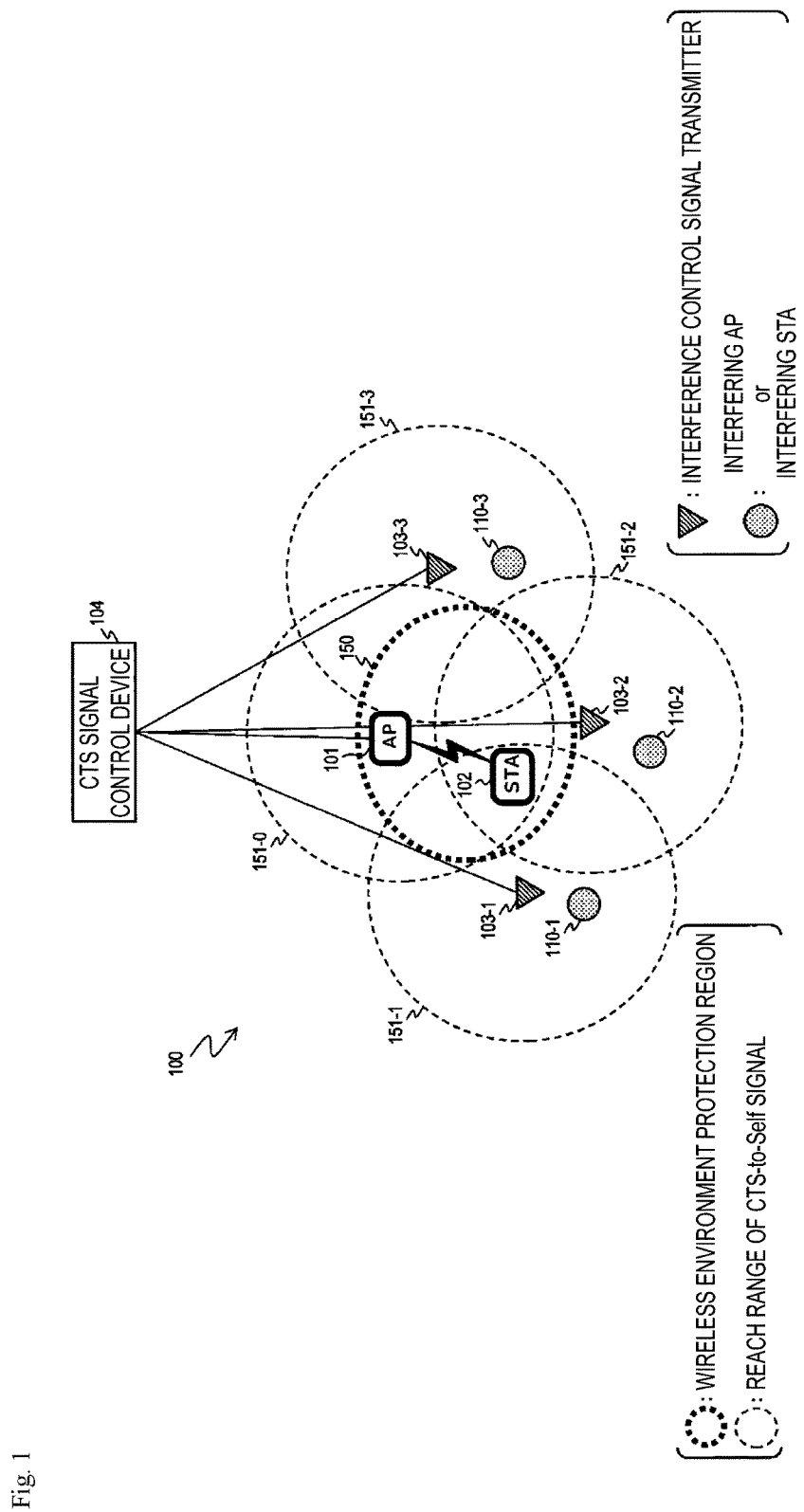
FIG. 1 is a diagram illustrating an example of basic configurations of wireless LAN systems described in embodiments.

FIG. 1 illustrates an example of a basic configuration of a wireless LAN system 100 described in each of the following embodiments. In FIG. 1, in the wireless LAN system 100, a wireless LAN base station device (access point: AP) 101 and a wireless LAN terminal device (station: STA) 102 which are protection targets and for which preferential communication is required perform wireless LAN communication. In addition, in the vicinity of these devices, there is an interfering communication device (an interfering AP or an interfering STA (referred to as an interfering AP/STA 110)), which is a source of interference. Further, there is at least one interference control signal transmitter 103 that performs the acquisition of wireless environment information of the interfering AP/STA 110 or the like and the transmission of an interference control signal (CTS-to-self signal) for controlling the interference of the interfering AP/STA 110, and the AP 101 and the interference control signal transmitter 103 are connected to a CTS signal control device 104 via a network. Note that the CTS signal control device 104 corresponds to an interference control signal management device and instructs the interference control signal transmitter 103 and the AP 101 to transmit a CTS-to-self signal. In the example illustrated in FIG. 1, the number of APs 101 and the number of STAs 102 that are protection targets are both one, but the CTS signal control device 104 operates in the same manner even in a case where a plurality of wireless LAN communications performed by a plurality of APs 101 and a plurality of STAs 102 are protected. Note that, in each of the following embodiments, description will be given on the assumption that the interference control signal transmitter 103 transmits a CTS-to-self signal that causes the interfering AP/STA 110 to wait for transmission, but other APs 101 that do not perform protected communication may transmit a CTS-to-self signal that causes the interfering AP/STA 110 to wait for transmission instead of the interference control signal transmitter 103.

Here, in the example illustrated in FIG. 1, three interference control signal transmitters 103-1, 103-2, and 103-3 are disposed as the interference control signal transmitter 103, but the number of interference control signal transmitters does not need to be three. In addition, the number of the interfering AP/STA 110-1 to the interfering AP/STA 110-3 likewise need not be three. Note that, in the following description, in a case where a specific interference control signal transmitter 103 is indicated, a numeral is added to the end of a sign, and the description is made as the interference control signal transmitter 103-1. In a case where it is common to the interference control signal transmitter 103-1 to the interference control signal transmitter 103-3, a numeral is omitted at the end of the sign, and the description is made as the interference control signal transmitter 103. The interfering AP/STA 110-1 to the interfering AP/STA 110-3 are similarly indicated.

In FIG. 1, the wireless LAN system 100 suppresses an interference signal from the interfering AP/STA 110 to wireless LAN communications between the AP 101 and the STA 102 and protects wireless LAN communication between the AP 101 and the STA 102 in a wireless environment protection region 150. For this, in the present embodiment, the CTS signal control device 104 collects wireless environment information acquired by the AP 101 and the interference control signal transmitter 103, and ascertains the interfering AP/STAs 110 using the same channel around the AP 101 and the STA 102 and the interference control signal transmitter 103 having the interfering AP/STAs 110 in its communication area. Then, the CTS signal control device 104 causes the interference control signal transmitter 103 to transmit a CTS-to-self signal, which is an interference control signal, and sets a transmission waiting period (network allocation vector (NAV)) in the interfering AP/STA 110 in the communication area of the interference control signal transmitter 103. Thereby, the CTS signal control device 104 forms a clean radio wave environment with no interference signals around the AP 101 and the STA 102, and causes the AP 101 and the STA 102 to perform preferential communication with each other.

Note that the CTS signal control device 104 selects any one interference control signal transmitter 103 in a case where there is one interfering AP/STA 110 in a communication area which is common to the plurality of interference control signal transmitters 103. In this case, the clean radio wave environment in the AP 101 and the STA 102 is a communication area (an reach range 151 of a CTS-to-self signal) of the interference control signal transmitter 103. For example, in the case of the interference control signal transmitter 103-1, a reach range 151-1 of a CTS-to-self signal is obtained.

First Embodiment

Figure 2:
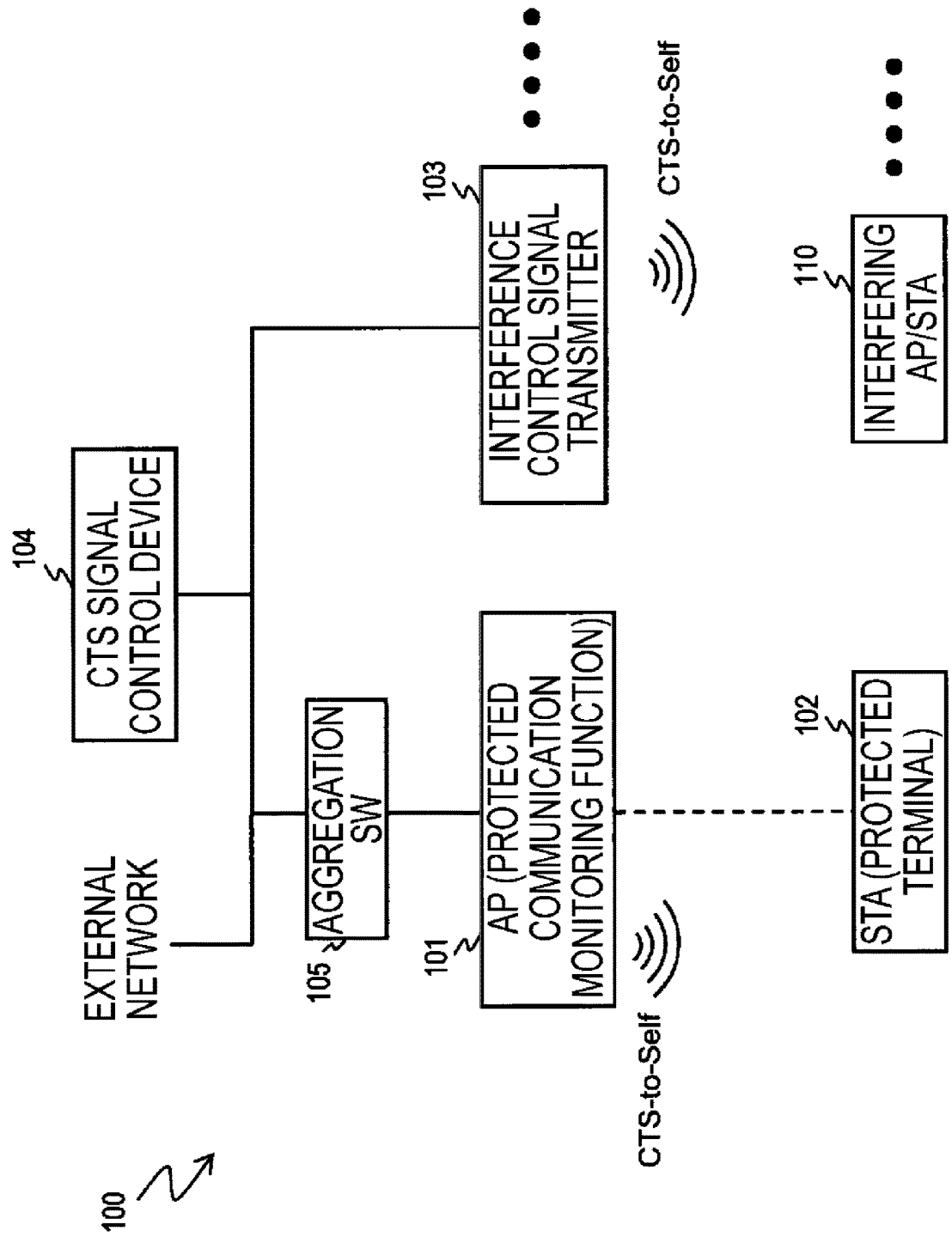
FIG. 2 is a diagram illustrating a configuration example of a wireless LAN system according to a first embodiment.

FIG. 2 illustrates a configuration example of the wireless LAN system 100 according to a first embodiment. In FIG. 2, blocks having the same reference numerals as those illustrated in FIG. 1 indicate the same blocks as those illustrated in FIG. 1. However, the AP 101 according to the first embodiment has a function of monitoring wireless LAN communication (referred to as protected communication), which is a protection target set by the CTS signal control device 104, and notifying the CTS signal control device 104 of the start or stop of the protected communication when the start or stop of the protected communication has been detected (protected communication monitoring function). In addition, an aggregation SW 105 is a network switch that aggregates communication to a higher network in a case where there are a plurality of APs 101.

In FIG. 2, the CTS signal control device 104 collects wireless environment information from the AP 101 and the interference control signal transmitter 103. Here, the wireless environment information is information such as a service set identifier (SSID), a MAC address, a port number, a received signal strength indicator (RSSI), a channel, a bandwidth, and the type of wireless LAN standard.

The CTS signal control device 104 sets the AP 101 and the STA 102 that are protection targets on the basis of the collected wireless environment information and notifies the AP 101 of information such as a MAC address and a port number for detecting protected communication (protected communication information). Note that the determination of the AP 101 and the STA 102 that are protection targets may be performed by registering a MAC address and the like of a specific STA 102 in advance or is performed using the type of application based on a port number, or the like. The CTS signal control device 104 determines that the wireless LAN communication is a wireless LAN communication to be protected, for example, in a case where the type of application is VoIP, a streaming video, or the like requiring real-time performance.

Furthermore, the CTS signal control device 104 determines the interfering AP/STA 110 that interferes with wireless LAN communication between the AP 101 and the STA 102 that are protection targets and the interference control signal transmitter 103 having the interfering AP/STA 110 in its communication area on the basis of the wireless environment information and the protected communication information. Then, the CTS signal control device 104 creates a scheduling policy for transmitting a CTS-to-self signal and notifies the corresponding interference control signal transmitter 103 and AP 101 of the created scheduling policy. Here, the scheduling policy includes wireless LAN setting information such as a transmission period, a bandwidth, and a channel of the CTS-to-self signal, information required to generate a CTS frame such as a MAC address, a port number, and a NAV period, and the like.

Then, the AP 101 transmits a CTS-to-self signal, which is destined for the STA 102 generated in accordance with the scheduling policy, to the STA 102 to be protected when the start of protected communication is detected and notifies the CTS signal control device 104 of the start of the protected communication. When the CTS signal control device 104 receives the start notification of the protected communication from the AP 101, the CTS signal control device 104 instructs the corresponding interference control signal transmitter 103 to start transmitting the CTS-to-self signal. Similarly, the AP 101 stops transmitting the CTS-to-self signal to the STA 102 to be protected when the stop of protected communication is detected, and notifies the CTS signal control device 104 of the stop of protected communication, and the CTS signal control device 104 instructs the corresponding interference control signal transmitter 103 to stop transmitting the CTS-to-self signal. Here, when the transmission of the CTS-to-self signal is started, the CTS-to-self signal is repeatedly transmitted at a transmission period designated in the scheduling policy until the stop of transmission is received.

In this manner, the wireless LAN system 100 according to the first embodiment notifies the CTS signal control device 104 of start or stop of protected communication detected by the AP 101, and the CTS signal control device 104 instructs the interference control signal transmitter 103 to start or stop transmitting the CTS-to-self signal, whereby it is possible to prohibit wireless LAN communication of the interfering AP/STA 110 for a period during which protected communication is performed. Thereby, the interfering AP/STA 110 can use a period during which protected communication is not performed for communication, and thus it is possible to improve the communication efficiency of the entire wireless LAN system 100.

Configuration Example of AP 101

Figure 3:
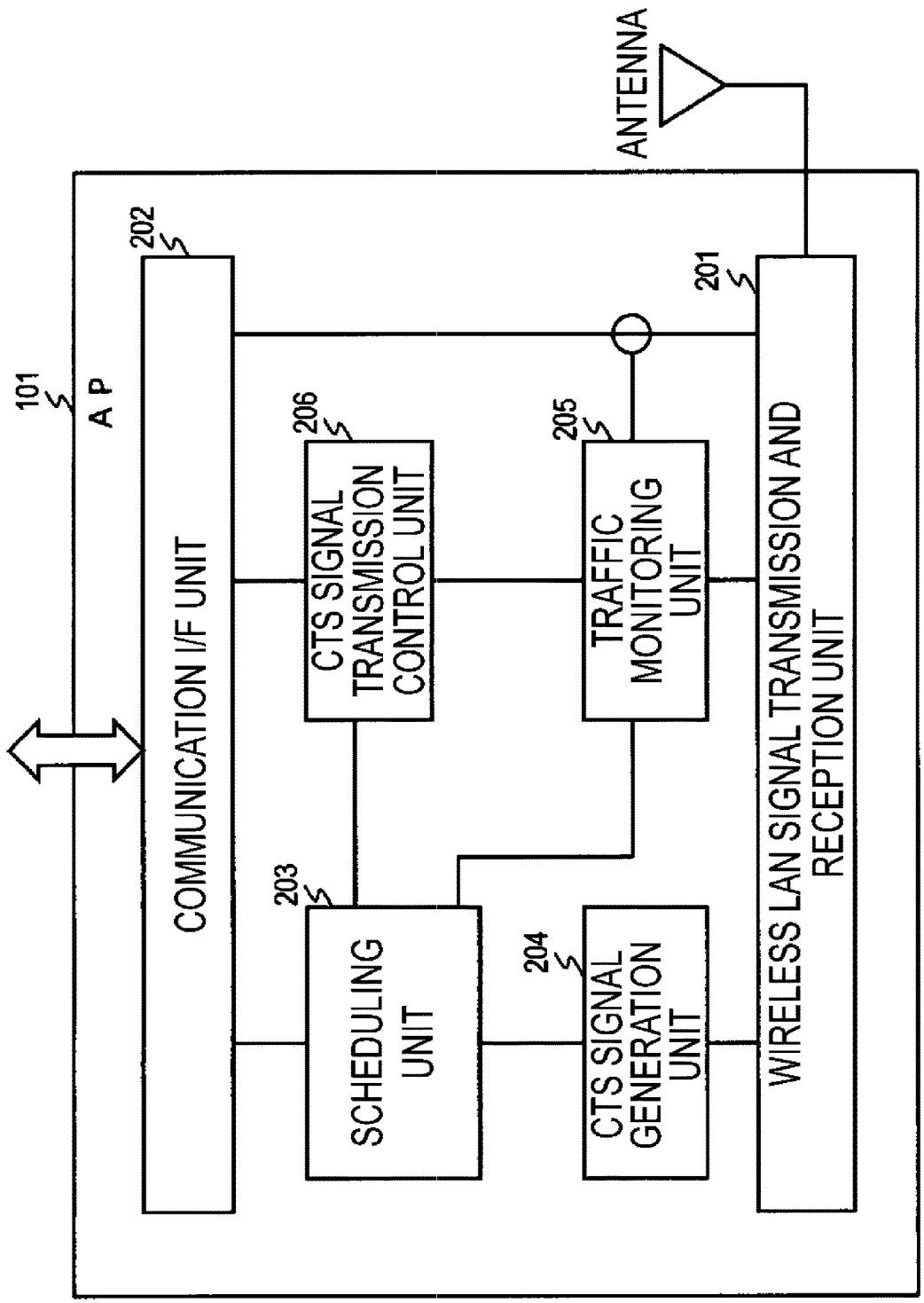
FIG. 3 is a diagram illustrating a configuration example of an AP.

FIG. 3 illustrates a configuration example of the AP 101. Note that the AP 101 illustrated in FIG. 3 is the AP 101 used in the wireless LAN system 100 according to the first embodiment described in FIG. 2 and has a protected communication monitoring function. Note that, in the case of the wireless LAN system 100 according to a second embodiment to be described below, the AP 101 does not have the protected communication monitoring function.

In FIG. 3, the AP 101 includes a wireless LAN signal transmission and reception unit 201, a communication I/F unit 202, a scheduling unit 203, a CTS signal generation unit 204, a traffic monitoring unit 205, and a CTS signal transmission control unit 206.

The wireless LAN signal transmission and reception unit 201 corresponds to a wireless LAN communication unit including an antenna and an RF circuit for performing wireless LAN communication based on a wireless LAN standard and can perform wireless LAN communication with the STA 102. Note that the wireless LAN signal transmission and reception unit 201 can not only perform wireless LAN communication with the STA 102 which is a communication party but can also monitor wireless LAN communication performed by the interfering AP/STA 110. In addition, the wireless LAN signal transmission and reception unit 201 receives a CTS frame from the CTS signal generation unit 204 and transmits the CTS frame from the antenna.

The communication I/F unit 202 includes an interface circuit for performing communication with the CTS signal control device 104 via the aggregation SW 105.

The scheduling unit 203 receives protected communication information from the CTS signal control device 104 and outputs the received protected communication information to the traffic monitoring unit 205. In addition, the scheduling unit 203 instructs the CTS signal generation unit 204 to generate a CTS frame and start the transmission (or stop the transmission) of the CTS frame according to a scheduling policy received from the CTS signal control device 104. For example, in a case where the scheduling unit 203 has received the start notification of protected communication from the CTS signal transmission control unit 206, the scheduling unit 203 instructs the CTS signal generation unit 204 to generate a CTS frame and start transmitting the CTS frame. In a case where the scheduling unit 203 has received the stop notification of protected communication from the CTS signal transmission control unit 206, the scheduling unit 203 instructs the CTS signal generation unit 204 to stop transmitting the CTS frame.

The CTS signal generation unit 204 outputs a CTS frame generated with the STA 102 as a destination according to an instruction received from the scheduling unit 203 to the wireless LAN signal transmission and reception unit 201, and the wireless LAN signal transmission and reception unit 201 transmits the CTS frame as a CTS-to-self signal.

The traffic monitoring unit 205 monitors traffic to be communicated by the wireless LAN signal transmission and reception unit 201. Then, the traffic monitoring unit 205 detects the start/end of protected communication on the basis of protected communication information (a MAC address or a port number) designated by the scheduling unit 203 and notifies the CTS signal transmission control unit 206 of the start/end of protected communication. In addition, the traffic monitoring unit 205 monitors wireless LAN communication with another AP 101, STA 102, or the like including the interfering AP/STA 110 around the AP 101 to acquire wireless environment information and transmits the wireless environment information to the CTS signal control device 104 via the CTS signal transmission control unit 206 and the communication I/F unit 202.

The CTS signal transmission control unit 206 corresponds to an interference control signal control unit, outputs the start notification or stop notification of protected communication received from the traffic monitoring unit 205 to the scheduling unit 203, and transmits the start notification or stop notification to the CTS signal control device 104.

In this manner, the AP 101 according to the first embodiment can detect protected communication on the basis of the protected communication information notified from the CTS signal control device 104 to transmit a CTS-to-self signal and notify the CTS signal control device 104 of the detection of protected communication. Note that the AP 101 according to the second embodiment to be described below does not detect protected communication, generates a CTS frame on the basis of a scheduling policy notified from the CTS signal control device 104, and starts or stops transmitting a CTS-to-self signal on the basis of an instruction for start or stop transmitting a CTS signal received from the CTS signal control device 104.

Note that, although the scheduling unit 203, the CTS signal generation unit 204, and the CTS signal transmission control unit 206 which constitute the AP 101 are configured as separate blocks in the present embodiment for ease of understanding, the functions of the scheduling unit 203 and the CTS signal generation unit 204 may be integrated into one block including the CTS signal transmission control unit 206.

Configuration Example of Interference Control Signal Transmitter 103

Figure 4:
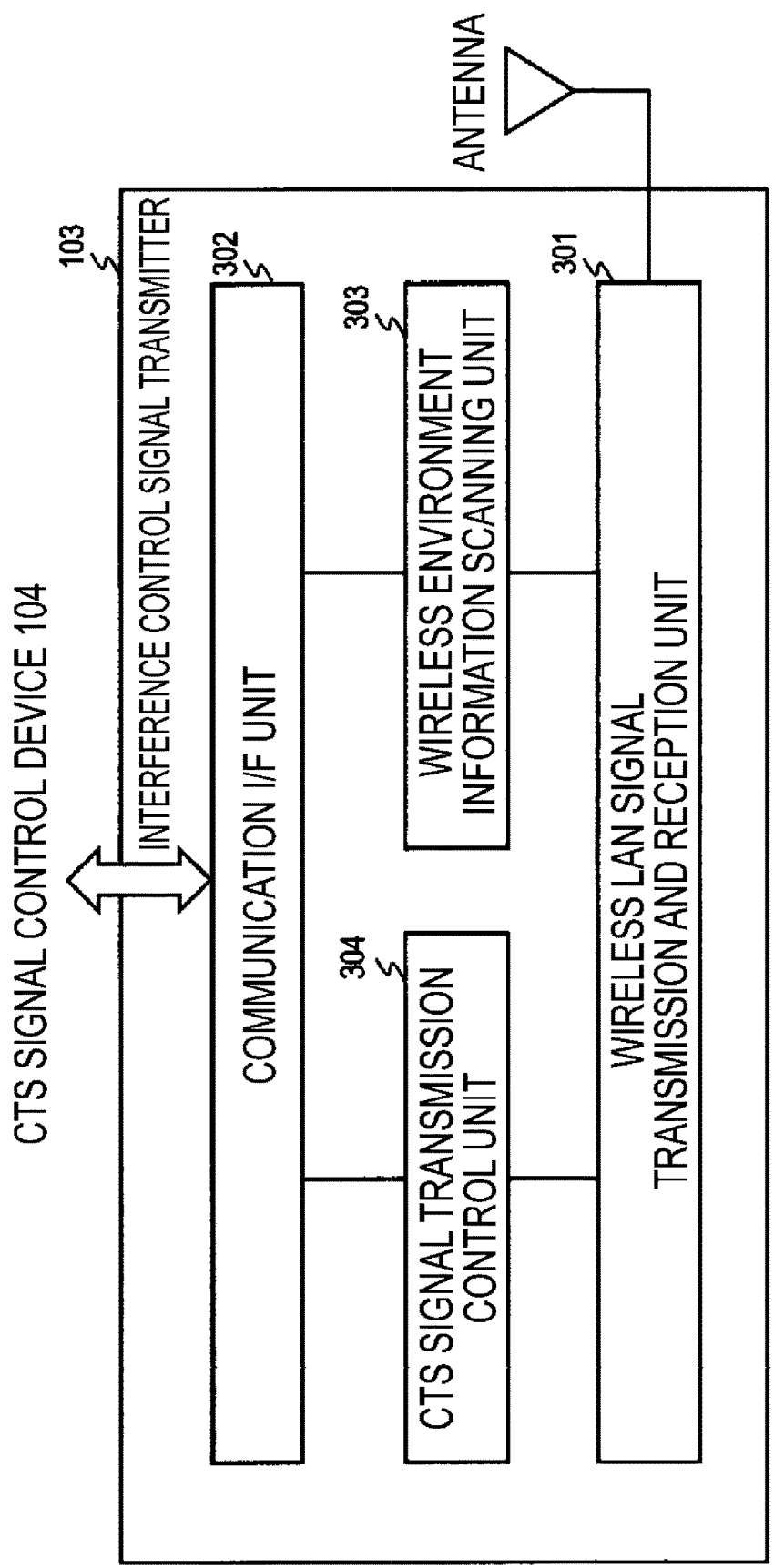
FIG. 4 is a diagram illustrating a configuration example of an interference control signal transmitter.

FIG. 4 illustrates a configuration example of the interference control signal transmitter 103. Note that the interference control signal transmitter 103 illustrated in FIG. 4 is an interference control signal transmitter 103 used in the wireless LAN system 100 according to the first embodiment (or the second embodiment to be described below) described in FIG. 2, and has a function of start and stop transmitting a CTS-to-self signal on the basis of an instruction received from the CTS signal control device 104.

In FIG. 4, the interference control signal transmitter 103 includes a wireless LAN signal transmission and reception unit 301, a communication I/F unit 302, a wireless environment information scanning unit 303, and a CTS signal transmission control unit 304.

Similar to the wireless LAN signal transmission and reception unit 201 of the AP 101, the wireless LAN signal transmission and reception unit 301 corresponds to a wireless LAN communication unit including an antenna and an RF circuit for performing wireless LAN communication based on a wireless LAN standard and can transmit a CTS-to-self signal. In addition, the wireless LAN signal transmission and reception unit 301 can monitor wireless LAN communication and the like performed by the interfering AP/STA 110. Furthermore, the wireless LAN signal transmission and reception unit 301 receives a CTS frame from the CTS signal transmission control unit 304 and transmits the received CTS frame from the antenna.

The communication I/F unit 302 includes an interface circuit for performing communication with the CTS signal control device 104.

The wireless environment information scanning unit 303 scans wireless LAN communication of the nearby interfering AP/STA 110 or the like using the wireless LAN signal transmission and reception unit 301 to acquire wireless environment information and transmits the wireless environment information from the communication I/F unit 302 to the CTS signal control device 104.

The CTS signal transmission control unit 304 generates a CTS frame that causes the interfering AP/STA 110 in a communication area to wait for transmission on the basis of a scheduling policy received from the CTS signal control device 104 and outputs the generated CTS frame to the wireless LAN signal transmission and reception unit 301. Here, the CTS signal transmission control unit 304 starts or stops transmitting a CTS-to-self signal on the basis of an instruction for start or stop transmitting a CTS signal received from the CTS signal control device 104. For example, the CTS signal transmission control unit 304 starts transmitting a CTS-to-self signal upon receiving an instruction for start transmitting a CTS signal from the CTS signal control device 104 and stops transmitting a CTS-to-self signal upon receiving an instruction for stop transmitting a CTS signal from the CTS signal control device 104.

In this manner, the interference control signal transmitter 103 transmits wireless environment information to the CTS signal control device 104. In addition, the interference control signal transmitter 103 generates a CTS frame on the basis of a scheduling policy notified from the CTS signal control device 104, and starts or stops transmitting a CTS-to-self signal on the basis of an instruction for start or stop transmitting a CTS signal received from the CTS signal control device 104.

Here, an AP 101 other than a protection target for which protected communication is not monitored may operate as the interference control signal transmitter 103. In this case, in the configuration of the AP 101 described in FIG. 3, the scheduling unit 203 causes the CTS signal generation unit 204 to generate a CTS frame of a CTS-to-self signal that causes the interfering AP/STA 110 to wait for transmission on the basis of the scheduling policy received from the CTS signal control device 104. Here, the scheduling unit 203 starts or stops transmitting a CTS-to-self signal on the basis of an instruction for start or stop transmitting a CTS signal received from the CTS signal control device 104. For example, the scheduling unit 203 outputs the CTS frame generated by the CTS signal generation unit 204 to the wireless LAN signal transmission and reception unit 201 upon receiving an instruction for start transmitting the CTS signal from the CTS signal control device 104 to start transmitting the CTS-to-self signal, and stops transmitting the CTS-to-self signal upon receiving an instruction for stop transmitting the CTS signal from the CTS signal control device 104. In this manner, the AP 101 can operate as the interference control signal transmitter 103.

Configuration Example of CTS Signal Control Device 104

Figure 5:
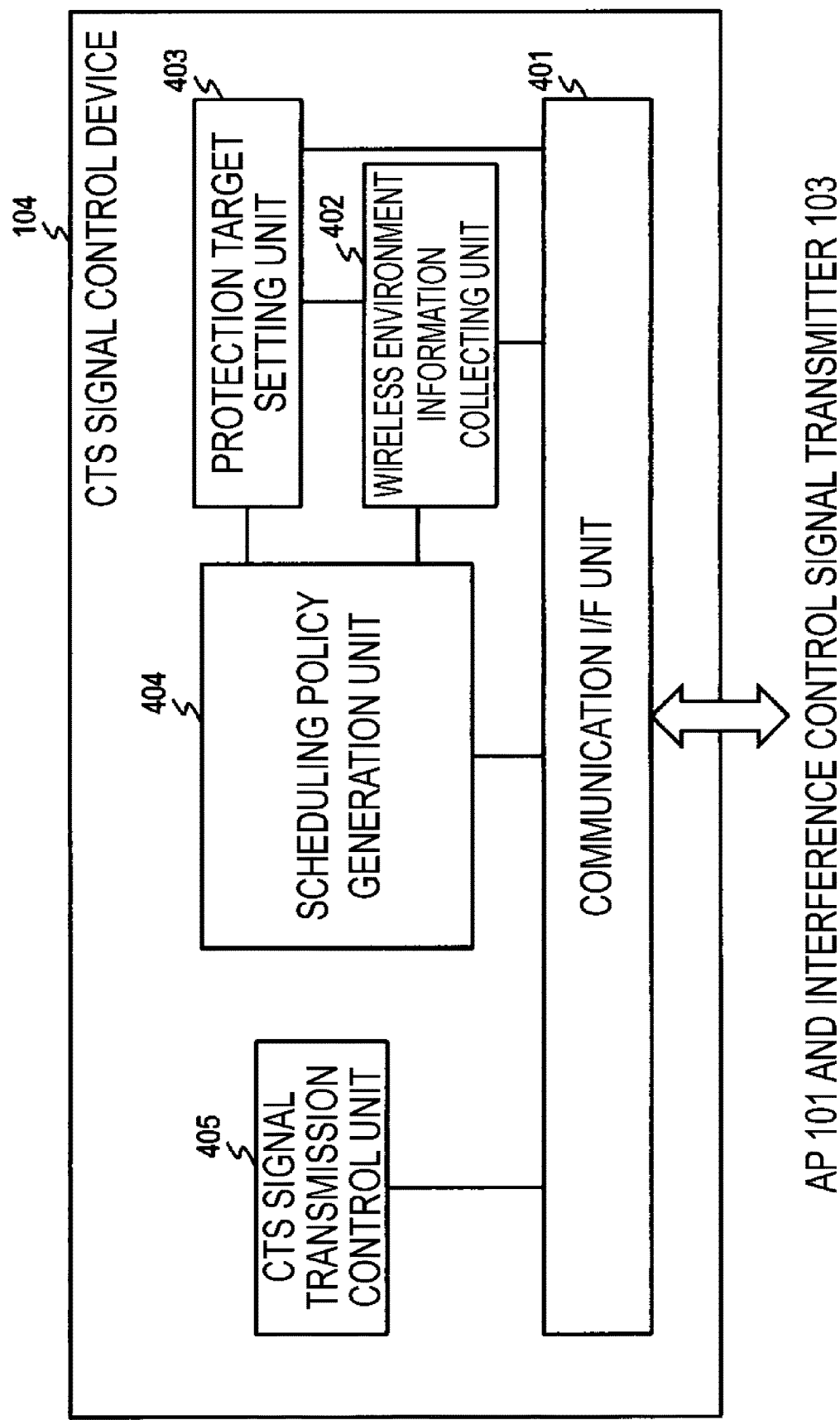
FIG. 5 is a diagram illustrating a configuration example of a CTS signal control device.

FIG. 5 illustrates a configuration example of the CTS signal control device 104. Note that the CTS signal control device 104 illustrated in FIG. 5 is the CTS signal control device 104 used in the wireless LAN system 100 according to the first embodiment (or the second embodiment to be described below) described in FIG. 2, and has a function of causing the interference control signal transmitter 103 to start or stop transmitting a CTS-to-self signal on the basis of the start notification or stop notification of protected communication notified from the AP 101 (or the communication monitoring device 106 to be described below).

In FIG. 5, the CTS signal control device 104 includes a communication I/F unit 401, a wireless environment information collecting unit 402, a protection target setting unit 403, a scheduling policy generation unit 404, and a CTS signal transmission control unit 405.

The communication I/F unit 401 includes an interface circuit for performing communication between the AP 101 and the interference control signal transmitter 103.

The wireless environment information collecting unit 402 collects wireless environment information observed by the AP 101 and the interference control signal transmitter 103, and stores the collected information therein (collecting the wireless environment information).

The protection target setting unit 403 sets the AP 101 and the STA 102 for performing wireless LAN communication to be protected on the basis of the wireless environment information (setting the wireless LAN communication and determining the interference control signal transmitter).

The scheduling policy generation unit 404 determines the interfering AP/STA 110 that interferes with protected communication on the basis of the wireless environment information collected by the wireless environment information collecting unit 402 and the protected communication information set by the protection target setting unit 403. In a case where there is an interfering AP/STA 110 that interferes with protected communication, the scheduling policy generation unit 404 generates a scheduling policy for causing the interference control signal transmitter 103 that has observed the wireless LAN communication causing interference to transmit a CTS-to-self signal. Then, the scheduling policy generation unit 404 transmits the generated scheduling policy to the corresponding interference control signal transmitter 103 from the communication I/F unit 401. Note that the scheduling policy is also transmitted to the AP 101.

When the CTS signal transmission control unit 405 receives the start notification or stop notification of protected communication from the AP 101, the CTS signal transmission control unit 405 notifies the interference control signal transmitter 103 having the interfering AP/STA 110 that interferes with the protected communication in its communication area to instruct the interference control signal transmitter 103 to start or stop transmitting a CTS-to-self signal (causing the interference control signal transmitter to transmit the interference control signal).

In this manner, the CTS signal control device 104 according to the present embodiment determines the AP 101 and the STA 102 which perform protected communication on the basis of wireless environment information collected from the AP 101 and the interference control signal transmitter 103, and notifies the AP 101 (or the communication monitoring device 106) that monitors protected communication of protected communication information. Then, the CTS signal control device 104 can instruct the interference control signal transmitter 103 to start or stop transmitting a CTS-to-self signal on the basis of the start notification or stop notification of protected communication received from the AP 101 (or the communication monitoring device 106). Thereby, the AP 101 and the STA 102 that are protection targets can perform wireless LAN communication in a clean wireless environment without interference from the interfering AP/STA 110. In particular, in the present embodiment, the AP 101 detects the start and stop of protected communication, and the CTS signal control device 104 stops communication of the interfering AP/STA 110 for a period during which protected communication is performed. Thus, a period during which protected communication is not performed can be used for the communication of the interfering AP/STA 110. Thereby, it is possible to improve the communication efficiency of the entire wireless LAN system 100.

Control Sequence in First Embodiment

Figure 6:
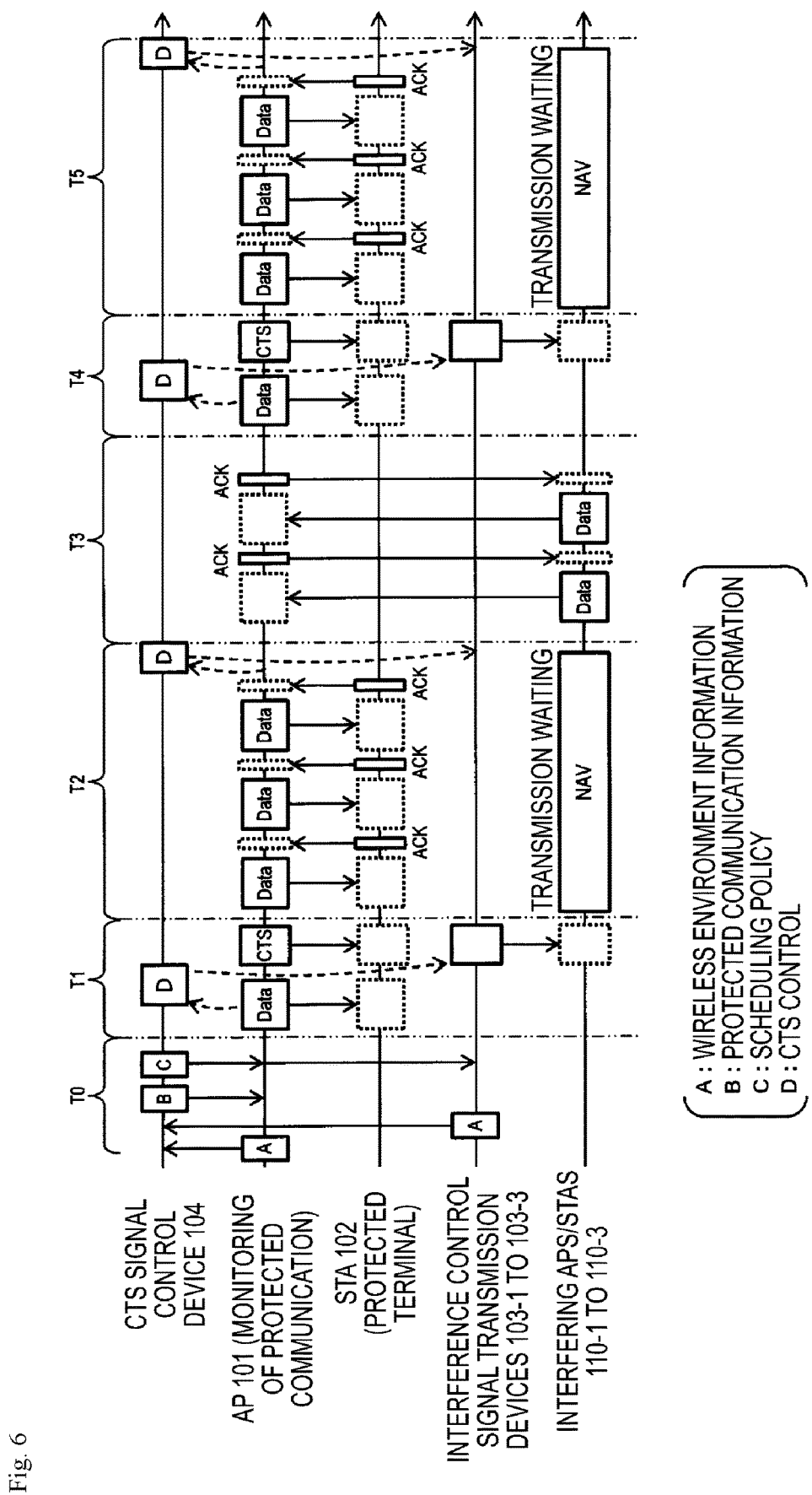
FIG. 6 is a diagram illustrating an example of a control sequence of a wireless LAN system according to the first embodiment.

FIG. 6 illustrates an example of a control sequence of the wireless LAN system 100 according to the first embodiment. Note that the control sequence in FIG. 6 is performed by the AP 101, the STA 102, the interference control signal transmitter 103, the CTS signal control device 104, and the interfering AP/STA 110 that are described with reference to FIG. 2. Here, in FIG. 6, A indicates wireless environment information, B indicates protected communication information, C indicates a scheduling policy, and D indicates CTS control.

In a period of T0, the CTS signal control device 104 collects wireless environment information from the AP 101 and the interference control signal transmitter 103. Then, the CTS signal control device 104 determines the AP 101 and the STA 102 that perform wireless LAN communication (protected communication) to be protected on the basis of the wireless environment information, and notifies the AP 101 of protected communication information. Furthermore, the CTS signal control device 104 determines the interfering AP/STA 110 that interferes with protected communication on the basis of the wireless environment information and the protected communication information. Then, in a case where there is an interfering AP/STA 110 that interferes with protected communication, the CTS signal control device 104 generates a scheduling policy for causing the interference control signal transmitter 103 that has observed the wireless LAN communication causing interference to transmit a CTS-to-self signal and transmits the generated scheduling policy to the AP 101 and the interference control signal transmitter 103.

In a period of T1, the AP 101 monitors data communication (protected communication) on the basis of protected communication information received from the CTS signal control device 104. When the AP 101 detects protected communication to the STA 102, the AP 101 notifies the CTS signal control device 104 of the start of the protected communication and transmits a CTS-to-self signal, having the STA 102 as a destination, to the STA 102. Then, the CTS signal control device 104 instructs the interference control signal transmitter 103 to start transmitting the CTS-to-self signal on the basis of the start notification of the protected communication received from the AP 101. The interference control signal transmitter 103 that has received the instruction transmits the CTS-to-self signal generated in accordance with the scheduling policy received from the CTS signal control device 104. Here, the CTS signal control device 104 transmits the CTS-to-self signal destined for the interfering AP/STA 110 or its own device, and the AP 101 transmits the CTS-to-self signal destined for the STA 102. In addition, the CTS signal control device 104 sets the same NAV period of a CTS-to-self signal for three interference control signal transmitters, that is, the interference control signal transmitter 103-1, the interference control signal transmitter 103-2, and the interference control signal transmitter 103-3, and causes each of the interference control signal transmitters 103 to transmit the CTS-to-self signal synchronously.

In a period of T2, the interfering AP/STA 110 is in a transmission waiting state with the NAV period set by the CTS-to-self signal transmitted from the interference control signal transmitter 103, and wireless LAN communication is performed in a clean wireless environment in which no interference occurs between the AP 101 and the STA 102 which are protection targets. Then, when the AP 101 detects the stop of protected communication, the AP 101 stops transmitting the CTS-to-self signal to the STA 102 and notifies the CTS signal control device 104 of the stop of the protected communication. The CTS signal control device 104 having been received the stop notification of the protected communication from the AP 101 instructs the interference control signal transmitter 103 to stop transmitting the CTS-to-self signal. Note that the AP 101 may detect the stop of the protected communication in a case where protected communication has not been performed for a predetermined period. Here, in a case where protected communication is performed for a long period of time equal to or longer than a maximum period of time that can be set for a NAV of the CTS-to-self signal, the CTS-to-self signal is repeatedly transmitted from the interference control signal transmitter 103 at a transmission period designated in a scheduling policy. Then, the interference control signal transmitter 103 stops transmitting the CTS-to-self signal in accordance with an instruction for stop transmitting the CTS-to-self signal which is received from the CTS signal control device 104.

In a period of T3, the interfering AP/STA 110 can be released from the transmission waiting state by the interference control signal transmitter 103 stopping the transmission of the CTS-to-self signal, and can perform wireless LAN communication with the AP 101.

Note that operations in a period of T4 and a period of T5 are similar to the operations in the period of T1 and the period of T2 described above.

In this manner, the CTS signal control device 104 according to the present embodiment determines the AP 101 and the STA 102 that are protection targets on the basis of wireless environment information collected from the AP 101 and the interference control signal transmitter 103, and notifies the AP 101 that monitors protected communication of protected communication information. Then, the CTS signal control device 104 can instruct the interference control signal transmitter 103 to start or stop transmitting the CTS-to-self signal on the basis of the start notification or stop notification of the protected communication received from the AP 101. Thereby, the AP 101 and the STA 102 that are protection targets can perform wireless LAN communication in a clean wireless environment without interference from the interfering AP/STA 110. In particular, in the present embodiment, the AP 101 detects the start and stop of protected communication, and the CTS signal control device 104 stops communication of the interfering AP/STA 110 for a period during which protected communication is performed. Thus, a period during which protected communication is not performed can be used for the communication of the interfering AP/STA 110. Thereby, it is possible to improve the communication efficiency of the entire wireless LAN system 100.

Figure 7:
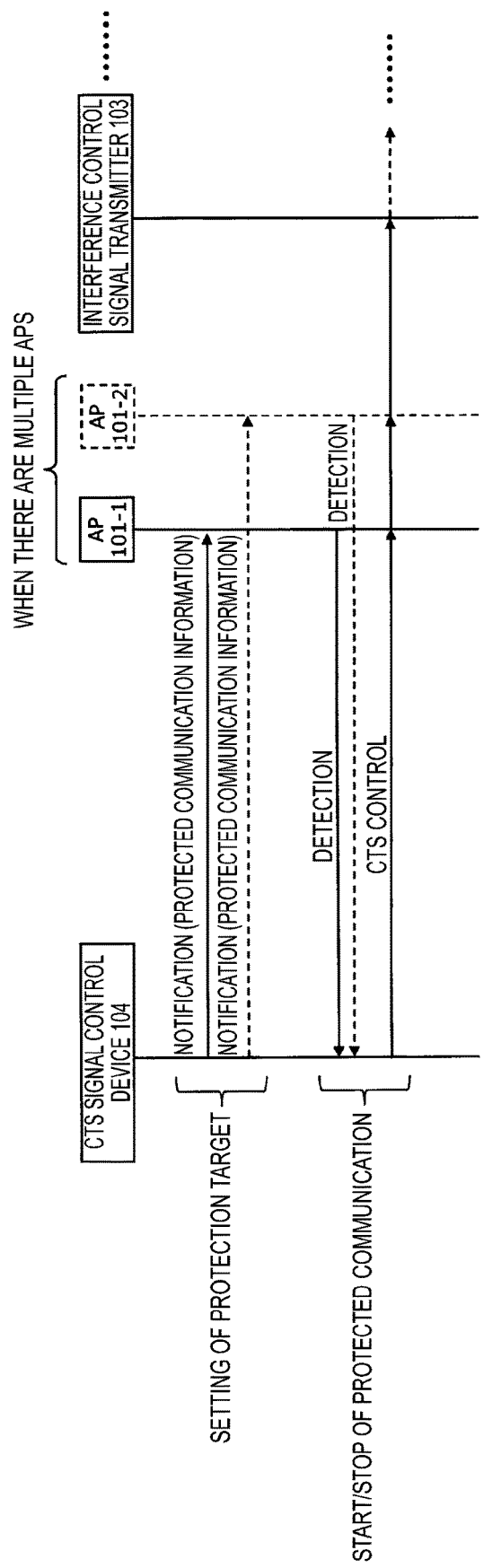
FIG. 7 is a diagram illustrating an example of a case where there are a plurality of APs in the first embodiment.

FIG. 7 illustrates an example of a case where there are a plurality of APs 101 in the first embodiment. In FIG. 7, two APs, that is, an AP 101-1 and an AP 101-2, are each provided with the STA 102 to be protected. That is, the CTS signal control device 104 is operated to protect a plurality of wireless LAN communications. Note that, similar to the AP 101 described above, the AP 101-1 and the AP 101-2 have a protected communication monitoring function.

In FIG. 7, the CTS signal control device 104 determines wireless LAN communication to be protected from wireless environment information collected by the AP 101-1, the AP 101-2, and the interference control signal transmitter 103, and notifies the AP 101-1 and the AP 101-2 of protected communication information. Then, when the AP 101-1 or the AP 101-2 detects the start or stop of protected communication, the AP 101-1 or the AP 101-2 notifies the CTS signal control device 104 of the start or stop of the protected communication. In a case where the CTS signal control device 104 has received the start notification or stop notification of the protected communication, the CTS signal control device 104 performs CTS control of the interference control signal transmitter 103 having the interfering AP/STA 110 that interferes with the protected communication in its communication area. For example, the CTS signal control device 104 instructs the interference control signal transmitter 103 to start transmitting a CTS-to-self signal in a case where the CTS signal control device 104 has received the start notification of the protected communication, and the CTS signal control device 104 instructs the interference control signal transmitter 103 to stop transmitting the CTS-to-self signal in a case where the CTS signal control device 104 has received the stop notification of the protected communication. Note that, in FIG. 7, because the CTS signal control device 104 controls a plurality of protected communications, the CTS signal control device 104 performs CTS control of the interference control signal transmitter 103 having the interfering AP/STA 110 that interferes with the protected communication of the AP 101-1 in its communication area in a case where the AP 101-1 has detected the start or stop of the protected communication, and the CTS signal control device 104 performs CTS control of the interference control signal transmitter 103 having the interfering AP/STA 110 that interferes with the protected communication of the AP 101-2 in its communication area in a case where the AP 101-2 has detected the start or stop of the protected communication.

Here, in FIG. 7, there are a plurality of APs 101, and thus the APs 101 may separately perform the transmission of a CTS-to-self signal destined for each of the STAs 102 at the time of detection of protected communication. However, an instruction for start transmitting the CTS-to-self signal may be transmitted from the CTS signal control device 104 to the AP 101-1 and the AP 101-2 so that the plurality of APs 101 transmit the CTS-to-self signal in synchronization with each other.

In this manner, the wireless LAN system 100 according to the present embodiment can cause the interfering AP/STA 110 that interferes with each protected communication to wait for the transmission even when the plurality of APs 101 perform a plurality of protected communications. Thereby, the AP 101-1 and the AP 101-2, which are protection targets, can perform wireless LAN communication in a clean wireless environment without interference from the interfering AP/STA 110. In particular, in the present embodiment, the AP 101 detects the start and stop of protected communication, and the CTS signal control device 104 stops communication of the interfering AP/STA 110 for a period during which protected communication is performed. Thus, a period during which protected communication is not performed can be used for the communication of the interfering AP/STA 110. Thereby, it is possible to improve the communication efficiency of the entire wireless LAN system 100.

Second Embodiment

Figure 8:
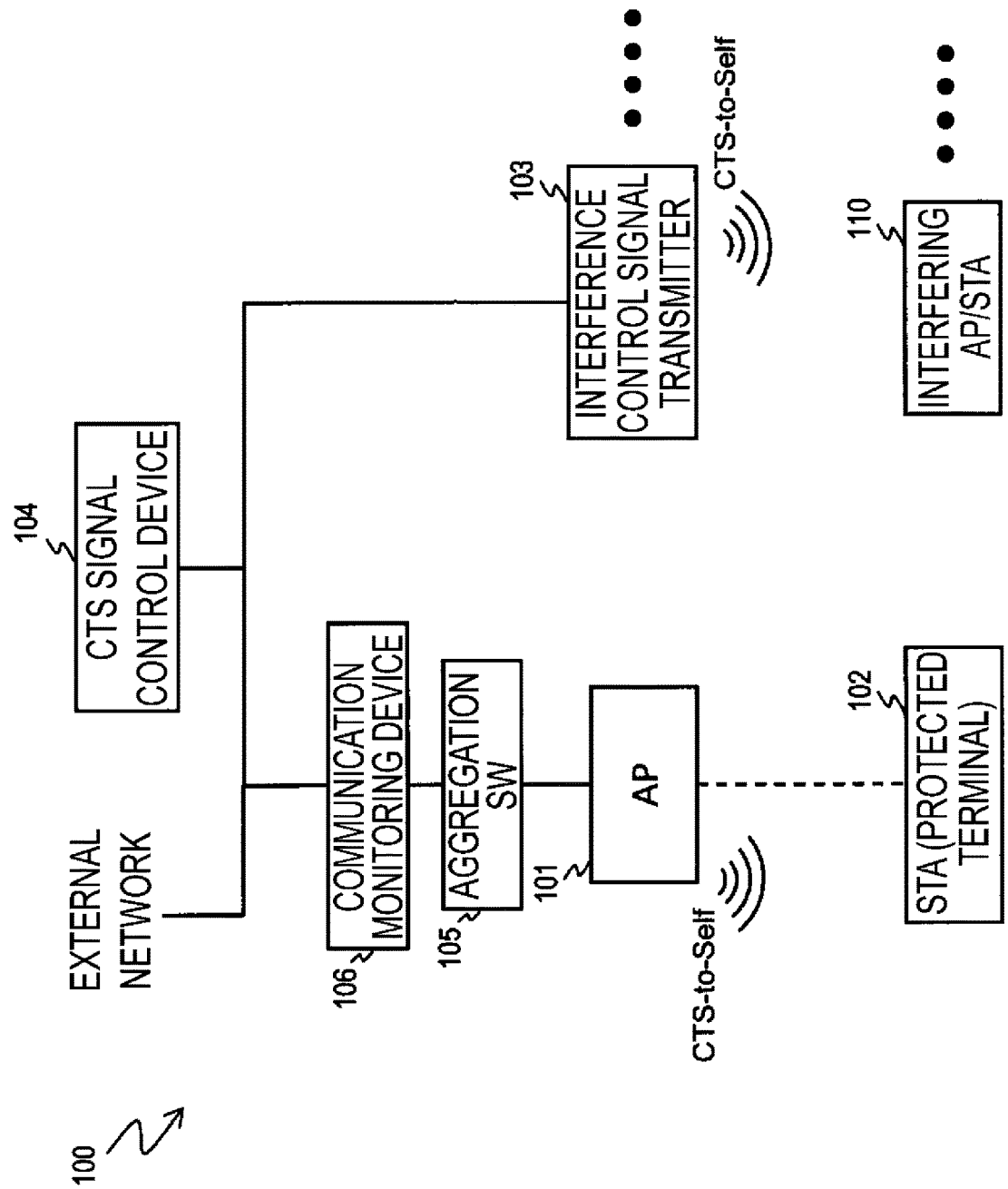
FIG. 8 is a diagram illustrating a configuration example of a wireless LAN system according to a second embodiment.

FIG. 8 illustrates a configuration example of a wireless LAN system 100 according to the second embodiment. The second embodiment is different from the first embodiment described in FIG. 2 in that an AP 101 illustrated in FIG. 8 has no protected communication monitoring function, and instead, a communication monitoring device 106 that monitors protected communication is disposed upstream of an aggregation SW 105. Regarding features of the present embodiment, even when the plurality of APs 101 perform a plurality of protected communications, each of the APs 101 does not need to be equipped with a protected communication monitoring function, and one communication monitoring device 106 can detect the start or stop of the plurality of protected communications and notify a CTS signal control device 104 of the start or stop of the plurality of protected communications. Note that, in FIG. 8, an STA 102, an interference control signal transmitter 103, the CTS signal control device 104, and the aggregation SW 105 are operated in the same manner as in the first embodiment described in FIG. 2.

In FIG. 8, the CTS signal control device 104 collects wireless environment information from the AP 101 and the interference control signal transmitter 103 in the same manner as in the first embodiment.

Then, the CTS signal control device 104 sets the AP 101 and the STA 102 that perform one or a plurality of protected communications on the basis of the collected wireless environment information, and notifies the communication monitoring device 106 of one or a plurality of pieces of protected communication information. Furthermore, the CTS signal control device 104 determines the interfering AP/STA 110 that interferes with wireless LAN communication between the AP 101 and the STA 102 that are protection targets and the interference control signal transmitter 103 having the interfering AP/STA 110 in its communication area on the basis of the wireless environment information and the protected communication information. Then, the CTS signal control device 104 notifies the corresponding interference control signal transmitters 103 and AP 101 of a scheduling policy that causes the corresponding interference control signal transmitters 103 and AP 101 to transmit a CTS signal that causes the interfering AP/STA 110 to wait for the communication. Then, when the communication monitoring device 106 detects the start of protected communication, the communication monitoring device 106 transmits the start notification of protected communication to the CTS signal control device 104. When the CTS signal control device 104 receives the start notification of protected communication from the communication monitoring device 106, the CTS signal control device 104 instructs the corresponding interference control signal transmitters 103 and AP 101 to start transmitting a CTS-to-self signal. Similarly, when the communication monitoring device 106 detects the stop of protected communication, the communication monitoring device 106 notifies the CTS signal control device 104 of the stop notification of protected communication, and the CTS signal control device 104 instructs the corresponding interference control signal transmitter 103 and AP 101 to stop transmitting the CTS-to-self signal.

In this manner, in the wireless LAN system 100 according to the second embodiment, the communication monitoring device 106 detects the start or stop of one or a plurality of protected communications and notifies the CTS signal control device 104 of the start or stop of protected communication. Thus, the CTS signal control device 104 prohibits wireless LAN communication of the interfering AP/STA 110 for a period during which protected communication is performed, and a period during which protected communication is not performed can be used for the communication of the interfering AP/STA 110. Thereby, it is possible to improve the communication efficiency of the entire wireless LAN system 100.

Configuration Example of Communication Monitoring Device 106

Figure 9:
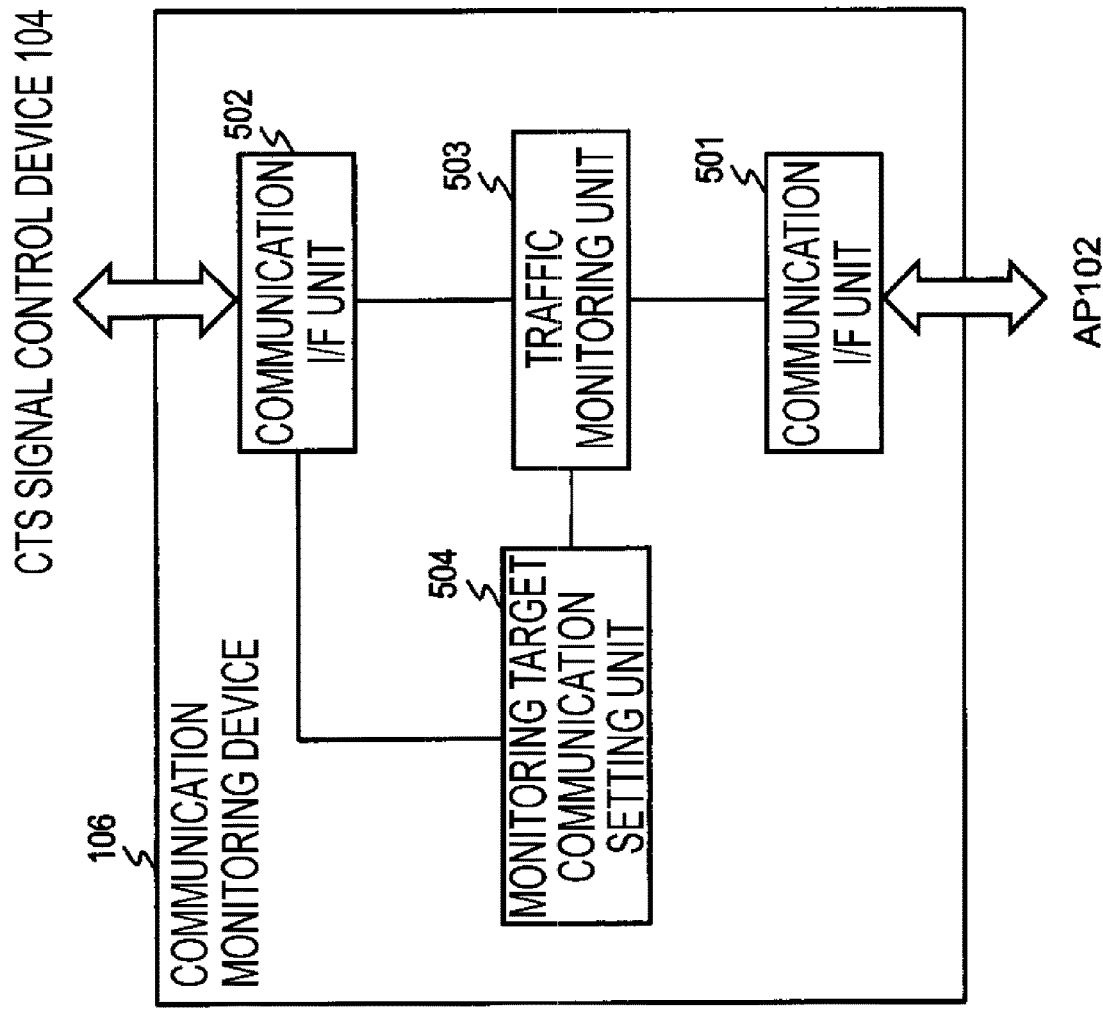
FIG. 9 is a diagram illustrating a configuration example of a communication monitoring device.

FIG. 9 illustrates a configuration example of the communication monitoring device 106. Note that the communication monitoring device 106 illustrated in FIG. 9 is used in the wireless LAN system 100 according to the second embodiment described in FIG. 8. Furthermore, the communication monitoring device 106 is disposed on a communication path of a network or at a position where communication can be detected. The communication monitoring device 106 is connected to the AP 101 (the number of APs may be two or more) via the aggregation SW 105 in the example illustrated in FIG. 8, and can collectively monitor a plurality of protected communications performed via the plurality of APs 101, for example.

In FIG. 9, the communication monitoring device 106 includes a communication I/F unit 501, a communication I/F unit 502, a traffic monitoring unit 503, and a monitoring target communication setting unit 504.

The communication I/F unit 501 includes an interface circuit for performing communication with the AP 101 via the aggregation SW 105.

The communication I/F unit 502 includes an interface circuit for performing communication with the CTS signal control device 104.

The traffic monitoring unit 503 has the same function as that of the traffic monitoring unit 205 of the AP 101 according to the first embodiment. The traffic monitoring unit 503 can monitor traffic of wireless LAN communication of a plurality of protection targets that pass through the aggregation SW 105, detects the start or end of a plurality of protected communications on the basis of protected communication information output by the monitoring target communication setting unit 504, and notifies the CTS signal control device 104 of the start or end of the protected communications.

The monitoring target communication setting unit 504 acquires protected communication information such as a MAC address and a port number of the AP 101 and the STA 102, which are protection targets, from the CTS signal control device 104, and outputs the protected communication information to the traffic monitoring unit 503.

In this manner, the communication monitoring device 106 according to the second embodiment can detect a plurality of protected communications performed between the APs 101 and the STAs 102, which are a plurality of protection targets and notify the CTS signal control device 104 of the protected communications on the basis of the protected communication information notified from the CTS signal control device 104.

Control Sequence in Second Embodiment

Figure 10:
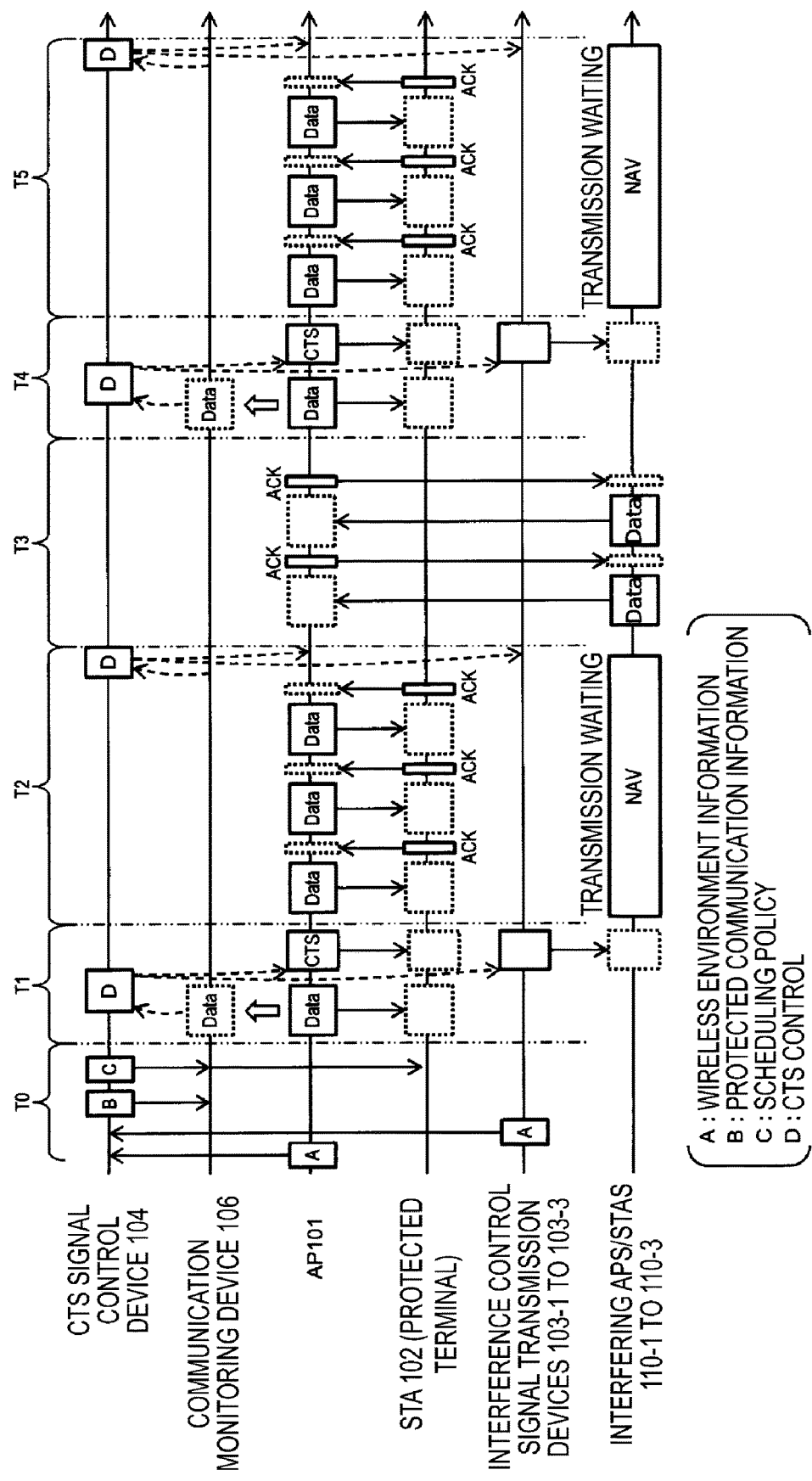
FIG. 10 is a diagram illustrating an example of a control sequence of the wireless LAN system according to the second embodiment.

FIG. 10 illustrates an example of a control sequence of the wireless LAN system 100 according to the second embodiment. Note that the control sequence in FIG. 10 is performed by the AP 101, the STA 102, the interference control signal transmitter 103, the CTS signal control device 104, the communication monitoring device 106, and the interfering AP/STA 110 that are described in FIG. 8. Here, FIG. 10 corresponds to FIG. 6 described in the first embodiment, but FIG. 10 is different from FIG. 6 in that the communication monitoring device 106 is added and in terms of the operation of the AP 101.

In a period of T0, the CTS signal control device 104 collects wireless environment information from the AP 101 and the interference control signal transmitter 103. Then, the CTS signal control device 104 determines the AP 101 and the STA 102 that perform wireless LAN communication (protected communication) to be protected on the basis of the wireless environment information, and notifies the communication monitoring device 106 of protected communication information. Furthermore, the CTS signal control device 104 determines the interfering AP/STA 110 that interferes with protected communication on the basis of the wireless environment information and the protected communication information. Then, in a case where there is an interfering AP/STA 110 that interferes with protected communication, the CTS signal control device 104 generates a scheduling policy for causing the interference control signal transmitter 103 that has observed the wireless LAN communication causing interference to transmit a CTS-to-self signal and transmits the generated scheduling policy to the AP 101 and the interference control signal transmitter 103.

In a period of T1, the communication monitoring device 106 monitors data communication (protected communication) on the basis of the protected communication information received from the CTS signal control device 104. In a case where the communication monitoring device 106 has detected the protected communication to the protected terminal STA 102, the communication monitoring device 106 notifies the CTS signal control device 104 of the start of the protected communication. Then, the CTS signal control device 104 instructs the AP 101 and the interference control signal transmitter 103 to start transmitting the CTS-to-self signal on the basis of the start notification of protected communication received from the communication monitoring device 106. The AP 101 and the interference control signal transmitter 103 which have received this instruction transmit a CTS signal generated in accordance with a scheduling policy received from the CTS signal control device 104. Here, the interference control signal transmitter 103 transmits a CTS-to-self signal destined for the interfering AP/STA 110 or its own device, and the AP 101 transmits a CTS-to-self signal destined for the STA 102.

In a period of T2, the interfering AP/STA 110 is in a transmission waiting state with the NAV period set by the CTS-to-self signal transmitted from the interference control signal transmitter 103, and wireless LAN communication is performed in a clean wireless environment in which no interference occurs between the AP 101 and the STA 102. Then, when the communication monitoring device 106 detects the stop of protected communication, the communication monitoring device 106 notifies the CTS signal control device 104 of the stop of protected communication. The CTS signal control device 104 having been received the stop notification of the protected communication from the communication monitoring device 106 instructs the AP 101 and the interference control signal transmitter 103 to stop transmitting the CTS-to-self signal. Here, the communication monitoring device 106 may detect the stop of protected communication in a case where the protected communication has not been performed for a predetermined period.

Note that operations in a period of T3 are similar to the operations in the period of T3 in FIG. 6. In addition, operations in a period of T4 and a period of T5 are similar to the operations in the period of T1 and the period of T2 described above.

In this manner, the CTS signal control device 104 according to the present embodiment determines the AP 101 and the STA 102, which perform protected communication, on the basis of wireless environment information collected from the AP 101 and the interference control signal transmitter 103, and notifies the communication monitoring device 106 that monitors protected communication of protected communication information. Then, the CTS signal control device 104 can instruct the AP 101 and the interference control signal transmitter 103 to start or stop transmitting a CTS-to-self signal on the basis of the start notification or stop notification of the protected communication received from the communication monitoring device 106. Thereby, the AP 101 and the STA 102 that are protection targets can perform wireless LAN communication in a clean wireless environment without interference from the interfering AP/STA 110. In particular, in the present embodiment, the communication monitoring device 106 detects the start and stop of the protected communication, and the CTS signal control device 104 stops communication of the interfering AP/STA 110 for a period during which protected communication is performed. Thus, a period during which protected communication is not performed can be used for the communication of the interfering AP/STA 110. Thereby, it is possible to improve the communication efficiency of the entire wireless LAN system 100. Furthermore, in the present embodiment even when the plurality of APs 101 perform protected communication, each of the APs 101 does not need to be equipped with a protected communication monitoring function, and one communication monitoring device 106 can detect the start or stop of the plurality of protected communications and notify a CTS signal control device 104 of the start or stop of the plurality of protected communications.

Figure 11:
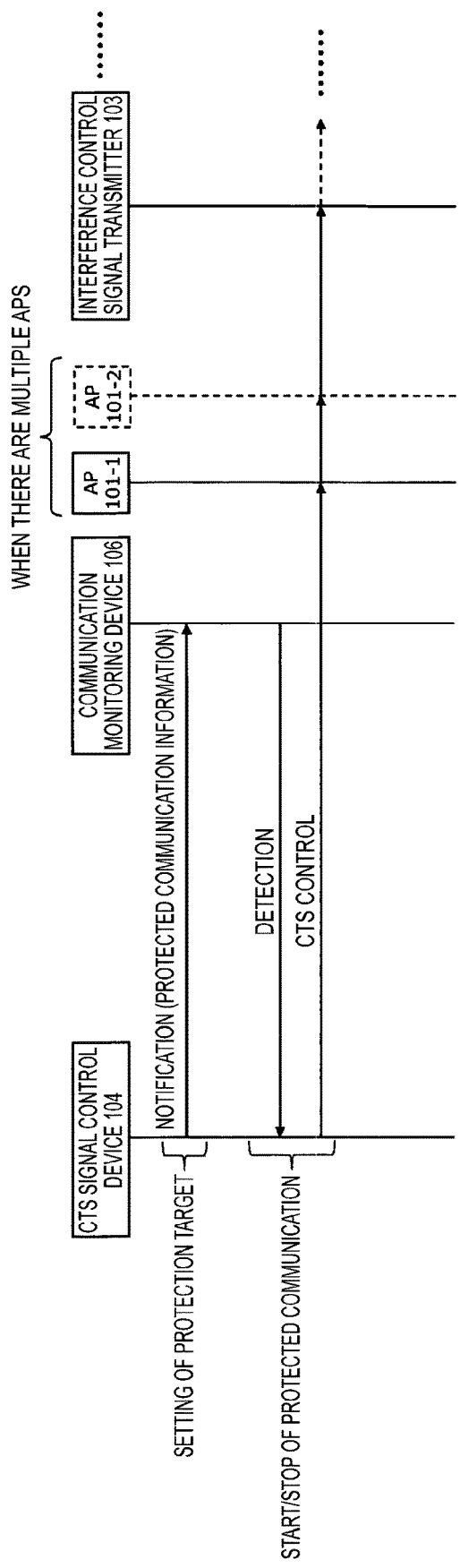
FIG. 11 is a diagram illustrating an example of a case where there are a plurality of APs in the second embodiment.

FIG. 11 illustrates an example of a case where there are a plurality of APs 101 in the second embodiment. In FIG. 11, two APs, that is, an AP 101-1 and an AP 101-2 are each provided with the STA 102 to be protected, and the CTS signal control device 104 protects a plurality of wireless LAN communications. Note that, similar to the AP 101 described in FIG. 8, the AP 101-1 and the AP 101-2 do not have a protected communication monitoring function, and the communication monitoring device 106 monitors protected communication.

In FIG. 11, the CTS signal control device 104 determines wireless LAN communication to be protected from wireless environment information collected from the AP 101-1, the AP 101-2, and the interference control signal transmitter 103, and notifies the communication monitoring device 106 of the protected communication information. Then, when the communication monitoring device 106 detects the start or stop of protected communication, the communication monitoring device 106 notifies the CTS signal control device 104 of the start or stop of the protected communication. In a case where the CTS signal control device 104 has received the start notification or stop notification of protected communication, the CTS signal control device 104 performs the CTS control of the interference control signal transmitter 103, the AP 101-1, and the AP 101-2. For example, the CTS signal control device 104 instructs the interference control signal transmitter 103, the AP 101-1, and the AP 101-2 to start transmitting a CTS-to-self signal in a case where the CTS signal control device 104 has received the start notification of protected communication, and the CTS signal control device 104 instructs the interference control signal transmitter 103, the AP 101-1, and the AP 101-2 to stop transmitting the CTS-to-self signal in a case where the CTS signal control device 104 has received the stop notification of protected communication. Note that, in FIG. 11, the CTS signal control device 104 controls a plurality of protected communications. Thus, the CTS signal control device 104 performs CTS control of the interference control signal transmitter 103 having the interfering AP/STA 110 that interferes with protected communication of the AP 101-1 in its communication area in a case where the communication monitoring device 106 has detected the start or stop of the protected communication of the AP 101-1, and the communication monitoring device 106 performs CTS control of the interference control signal transmitter 103 having the interfering AP/STA 110 that interferes with protected communication of the AP 101-2 in its communication area in a case where the communication monitoring device 106 has detected the start or stop of the protected communication of the AP 101-2.

Here, in FIG. 11, there are a plurality of APs 101 performing protected communication, and thus the APs 101 may separately transmit CTS-to-self signals destined for the respective STAs 102 at the time of detecting protected communication. However, the plurality of APs 101 may transmit the CTS-to-self signal in synchronization with each other in response to an instruction for start transmission of the CTS signal control device 104.

In this manner, the wireless LAN system 100 according to the present embodiment can cause the interfering AP/STA 110 that interferes with each protected communication to wait for the transmission even when the plurality of APs 101 perform a plurality of protected communications. Thereby, the AP 101-1 and the AP 101-2, which are protection targets, can perform wireless LAN communication in a clean wireless environment without interference from the interfering AP/STA 110. In particular, the communication monitoring device 106 detects the start and stop of a plurality of protected communications under management, and the CTS signal control device 104 stops the communication of the interfering AP/STA 110 for a period during which protected communication is performed. Thus, a period during which protected communication is not performed can be used for the communication of the interfering AP/STA 110. Thereby, it is possible to improve the communication efficiency of the entire wireless LAN system 100. Further, in the present embodiment, even when the plurality of APs 101-1 and APs 101-2 perform protected communication, each of the APs 101 does not need to be equipped with a protected communication monitoring function, and one communication monitoring device 106 can detect the start or stop of the plurality of protected communications and notify the CTS signal control device 104 of the start or stop of the plurality of protected communications.

Processing of CTS Signal Control Device 104

Figure 12:
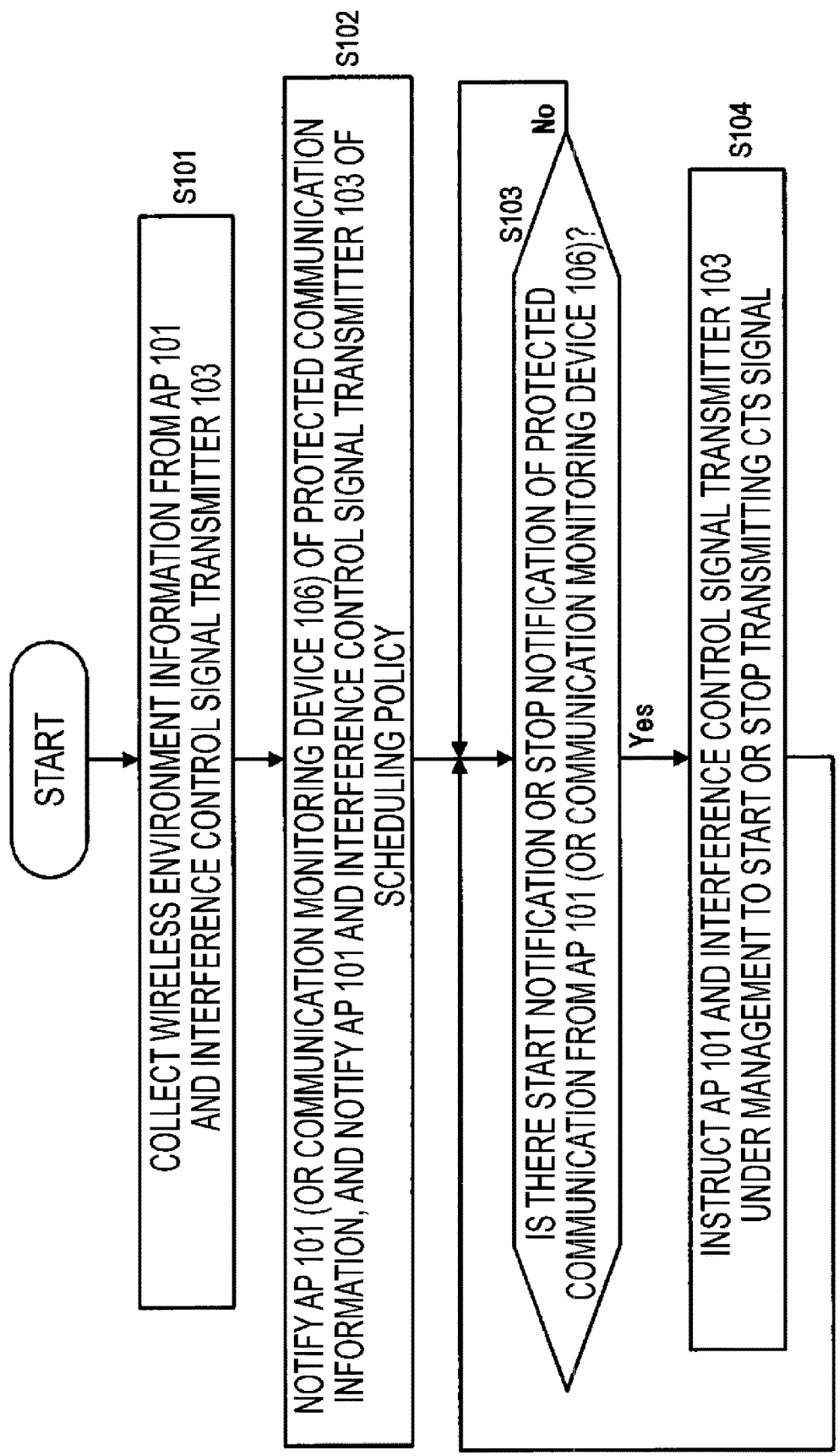
FIG. 12 is a diagram illustrating an example of a flowchart of CTS control of a CTS signal control device described in the first and second embodiments.

FIG. 12 illustrates an example of a flowchart of CTS control of the CTS signal control device 104 described in the first and second embodiments.

In step S101, the wireless environment information collecting unit 402 of the CTS signal control device 104 collects wireless environment information from the AP 101 and the interference control signal transmitter 103.

In step S102, the protection target setting unit 403 of the CTS signal control device 104 determines the AP 101 and the STA 102 that perform protected communication on the basis of the collected wireless environment information, and notifies the AP 101 (or the communication monitoring device 106) of protected communication information. In addition, the scheduling policy generation unit 404 notifies the AP 101 and the interference control signal transmitter 103 of a scheduling policy generated on the basis of the wireless environment information and the protected communication information.

In step S103, the CTS signal transmission control unit 405 of the CTS signal control device 104 determines whether the start notification or stop notification of protected communication has been given from the AP 101 (or the communication monitoring device 106). Then, the CTS signal transmission control unit 405 waits until the start notification or stop notification of protected communication is given, and proceeds to the processing of step S104 in a case where the start notification or stop notification of protected communication has been given.

In step S104, the CTS signal control device 104 instructs the AP 101 and the interference control signal transmitter 103, which are being managed, to start or stop transmitting a CTS signal.

In this manner, the CTS signal control device 104 notifies the AP 101 (or the communication monitoring device 106) of protected communication information, and can instruct the interference control signal transmitter 103 to start or stop transmitting a CTS-to-self signal on the basis of the start notification or stop notification of the protected communication which is received from the AP 101 (or the communication monitoring device 106).

Processing of AP 101

Figure 13:
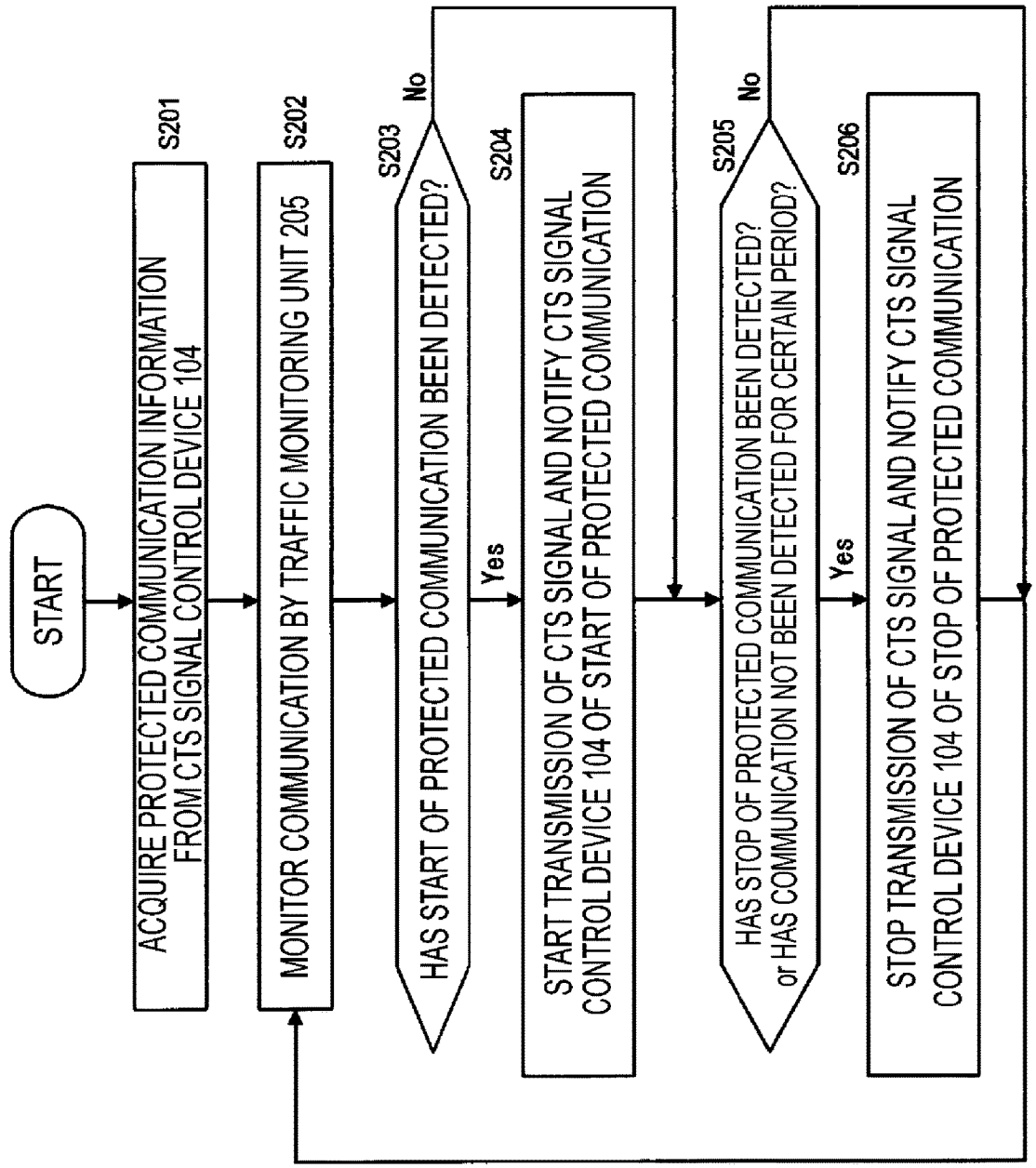
FIG. 13 is a diagram illustrating an example of a flowchart of an AP according to the first embodiment.

FIG. 13 illustrates an example of a flowchart of the AP 101 according to the first embodiment.

In step S201, the AP 101 acquires protected communication information from the CTS signal control device 104.

In step S202, the traffic monitoring unit 205 of the AP 101 monitors communication that passes through the AP 101.

In step S203, in a case where the traffic monitoring unit 205 has detected the start of the protected communication on the basis of the protected communication information, the processing proceeds to step S204, and in a case where the traffic monitoring unit 205 has not detected the start of the protected communication, the processing proceeds to step S205.

In step S204, the AP 101 starts transmitting a CTS signal (a CTS-to-self signal destined for the STA 102) and notifies the CTS signal control device 104 of the start of protected communication.

In step S205, in a case where the traffic monitoring unit 205 has detected the stop of protected communication, or in a case where protected communication has not been detected for a predetermined period, the processing proceeds to step S206. In a case where the traffic monitoring unit 205 has not detected the stop of protected communication, the processing returns to step S202, and similar processing operations are repeatedly executed.

In step S206, the AP 101 stops transmitting a CTS signal and notifies the CTS signal control device 104 of the stop of protected communication.

In this manner, the AP 101 monitors protected communication on the basis of the protected communication information acquired from the CTS signal control device 104, and starts transmitting the CTS signal and notifies the CTS signal control device 104 of the start of the protected communication in a case where the start of the protected communication has been detected, and stops transmitting the CTS signal and notifies the CTS signal control device 104 of the stop of the protected communication in a case where the stop of the protected communication has been detected, whereby it is possible to prevent communication efficiency from being reduced.

Processing of Communication Monitoring Device 106

Figure 14:
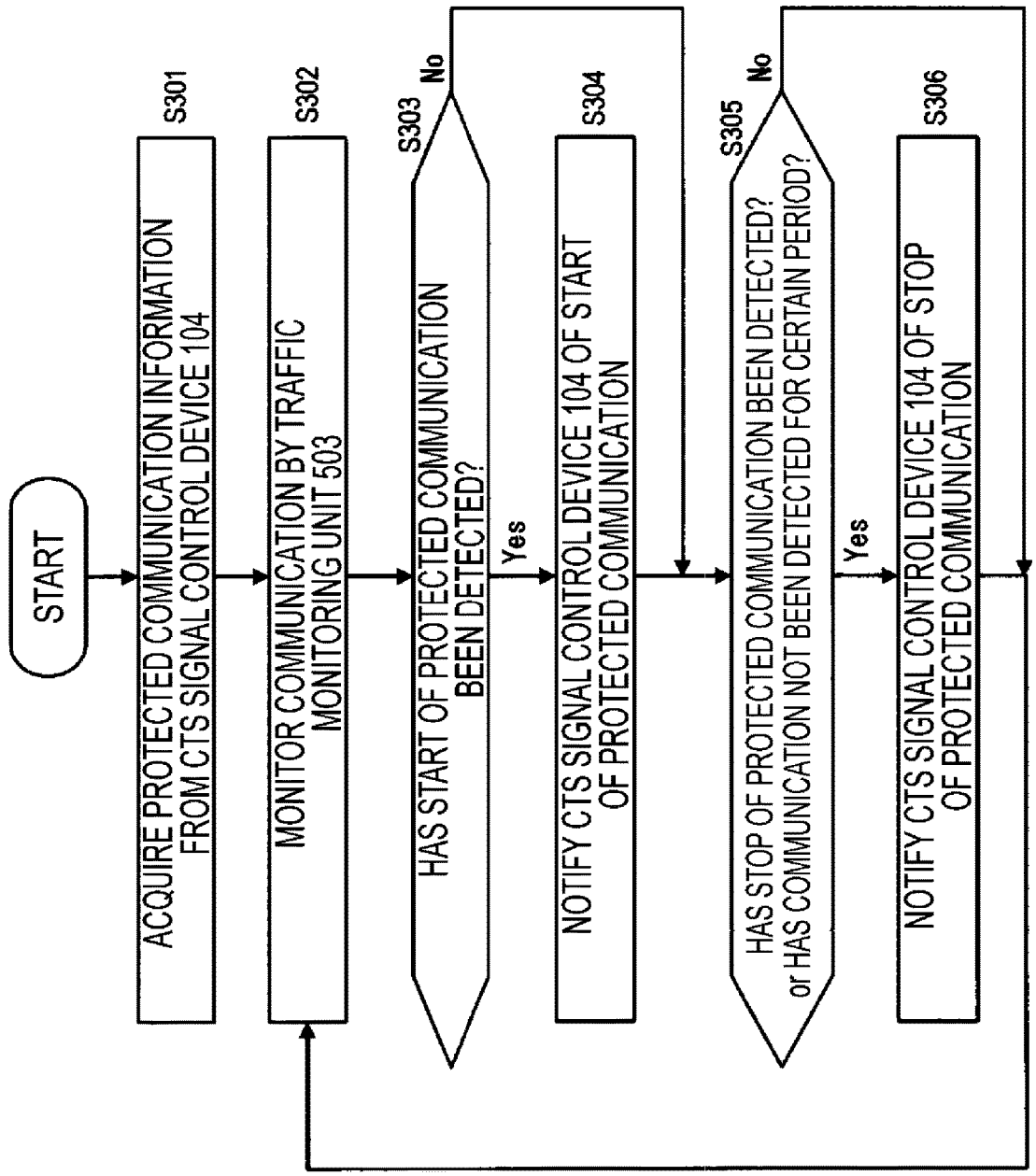
FIG. 14 is a diagram illustrating an example of a flowchart of the communication monitoring device according to the second embodiment.

FIG. 14 illustrates an example of a flowchart of the communication monitoring device 106 according to the second embodiment.

In step S301, the communication monitoring device 106 acquires protected communication information from the CTS signal control device 104.

In step S302, the traffic monitoring unit 503 of the communication monitoring device 106 monitors communication that passes through the communication monitoring device 106.

In step S303, in a case where the traffic monitoring unit 503 has detected the start of protected communication on the basis of the protected communication information, the processing proceeds to step S304, and in a case where the traffic monitoring unit 503 has not detected the start of protected communication, the processing proceeds to step S305.

In step S304, the communication monitoring device 106 notifies the CTS signal control device 104 of the start of protected communication.

In step S305, in a case where the traffic monitoring unit 503 has detected the stop of protected communication, or in a case where protected communication has not been detected for a predetermined period, the processing proceeds to step S306. In a case where the stop of protected communication has not been detected, the processing returns to step S302, and similar processing operations are repeatedly executed.

In step S306, the communication monitoring device 106 notifies the CTS signal control device 104 of the stop of protected communication.

In this manner, the communication monitoring device 106 monitors protected communication on the basis of the protected communication information acquired from the CTS signal control device 104. In a case where the start of the protected communication has been detected, the communication monitoring device 106 notifies the CTS signal control device 104 of the start of the protected communication to start transmitting a CTS signal. In a case where the stop of the protected communication has been detected, the communication monitoring device 106 notifies the CTS signal control device 104 of the stop of the protected communication to stop transmitting a CTS signal. Thus, it is possible to prevent communication efficiency from being reduced. Note that, in a case where the communication monitoring device 106 monitors a plurality of protected communications, the above-described processing is performed for each protected communication.

Application Example of First Embodiment

Figure 15:
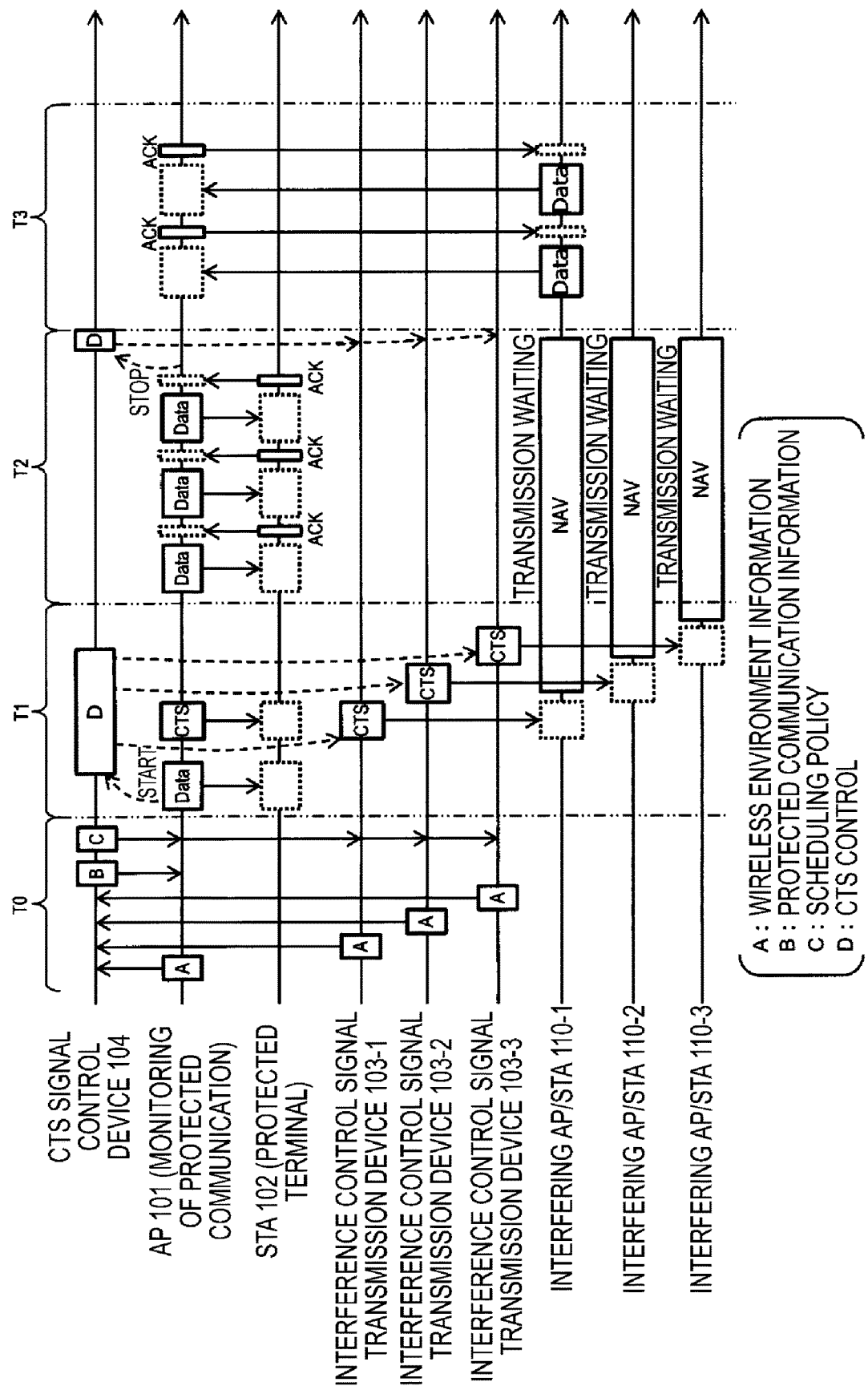
FIG. 15 is a diagram illustrating an application example of a control sequence of the wireless LAN system according to the first embodiment.

FIG. 15 illustrates an application example of a control sequence of the wireless LAN system 100 according to the first embodiment. Note that the control sequence of FIG. 15 is an application example of the control sequence of FIG. 6 and is performed by the AP 101, the STA 102, the interference control signal transmitter 103, the CTS signal control device 104, and the interfering AP/STA 110 that are described in FIG. 2. Here, in FIG. 15, A indicates wireless environment information, B indicates protected communication information, C indicates a scheduling policy, and D indicates CTS control.

In FIG. 15, a period of T0 is the same as that in the control sequence of FIG. 6, and the CTS signal control device 104 collects wireless environment information from the AP 101, and the interference control signal transmitters 103-1, 103-2, and 103-3. Then, the CTS signal control device 104 determines the AP 101 and the STA 102 that perform protected communication on the basis of the collected wireless environment information, and notifies the AP 101 of the protected communication information. Furthermore, the CTS signal control device 104 determines the interfering AP/STA 110 that interferes with protected communication on the basis of the wireless environment information and the protected communication information. Then, in a case where there is an interfering AP/STA 110 that interferes with protected communication, the CTS signal control device 104 generates a scheduling policy of a CTS-to-self signal to be transmitted from the interference control signal transmitter 103 that has observed wireless LAN communication causing interference, and transmits the generated scheduling policy to the AP 101 and the interference control signal transmitter 103.

In a period of T1, the AP 101 monitors data communication (protected communication) on the basis of protected communication information received from the CTS signal control device 104. When the AP 101 detects protected communication to the protected terminal STA 102, the AP 101 notifies the CTS signal control device 104 of the start of the protected communication and transmits a CTS-to-self signal, which is destined for the STA 102, to the STA 102. On the other hand, the CTS signal control device 104 instructs the interference control signal transmitter 103-1 to start transmitting the CTS-to-self signal on the basis of the start notification of the protected communication received from the AP 101. The interference control signal transmitter 103-1 that has received this instruction transmits the CTS-to-self signal generated in accordance with the scheduling policy received from the CTS signal control device 104. After this processing is ended, the CTS signal control device 104 instructs the interference control signal transmitter 103-2 to start transmitting the CTS-to-self signal, and the interference control signal transmitter 103-2 transmits the CTS-to-self signal generated in accordance with the scheduling policy received from the CTS signal control device 104. Further, the CTS signal control device 104 instructs the interference control signal transmitter 103-3 to start transmitting the CTS-to-self signal, and the interference control signal transmitter 103-3 transmits the CTS-to-self signal generated in accordance with the scheduling policy received from the CTS signal control device 104. In this manner, in the present application example, the CTS signal control device 104 causes the three interference control signal transmitter 103-1, the interference control signal transmitter 103-2, and the interference control signal transmitter 103-3 to transmit the CTS-to-self signals in sequence. At this time, the CTS signal control device 104 performs control so that NAV periods set to the CTS-to-self signals of the three interference control signal transmitter 103-1, the interference control signal transmitter 103-2, and the interference control signal transmitter 103-3 are ended simultaneously.

In a period of T2, the interfering AP/STA 110 is in a transmission waiting state with a NAV period set by the CTS-to-self signal transmitted from the interference control signal transmitter 103, and wireless LAN communication is performed in a clean wireless environment in which no interference occurs between the AP 101 and the STA 102. Here, after the AP 101 transmits the CTS-to-self signals to the STA 102, the AP 101 transmits a data frame after waiting until the three interference control signal transmitters 103 have transmitted the CTS-to-self signals. Note that a period of time required for the three interference control signal transmitters 103 to finish transmitting the CTS-to-self signals can be known on the basis of the scheduling policy received from the CTS signal control device 104. Then, when the AP 101 detects the stop of the protected communication, the AP 101 notifies the CTS signal control device 104 of the stop of the protected communication, and the CTS signal control device 104 instructs the interference control signal transmitters 103-1, 103-2, and 103-3 to stop transmitting the CTS-to-self signals. Note that the instructions for stop may be given at the same time.

In a period of T3, the interfering AP/STA 110 can be released from the transmission waiting state by the interference control signal transmitters 103 stopping the transmission of the CTS-to-self signal, and can perform wireless LAN communication with the AP 101.

In this manner, in the present application example, the plurality of interference control signal transmitters 103 transmit the CTS-to-self signals in sequence so as not to temporally overlap each other. Thus, even when one interfering AP/STA 110 is present in a communication area which is common to the plurality of interference control signal transmitters 103, it is possible to make the CTS-to-self signals transmitted by the plurality of interference control signal transmitters 103 not interfere with each other. Here, a NAV period set to a CTS-to-self signal transmitted by the interference control signal transmitter 103-1, a NAV period set to a CTS-to-self signal transmitted by the interference control signal transmitter 103-2, and a NAV period set to a CTS-to-self signal transmitted by the interference control signal transmitter 103-3 have different start times and lengths, respectively, but end time of each of the NAV periods is set to be the same.

Note that, also in the present application example, the CTS signal control device 104 instructs the interference control signal transmitters 103-1 to 103-3 to start or stop transmitting the CTS-to-self signals on the basis of the start notification or stop notification of protected communication which is received from the AP 101. Thus, the AP 101 and the STA 102 that are protection targets can perform wireless LAN communication in a clean wireless environment without interference from the interfering AP/STA 110, and a period during which protected communication is not performed can be used for the communication of the interfering AP/STA 110. Thereby, it is possible to improve the communication efficiency of the entire wireless LAN system 100.

Wireless LAN System 900 of Comparative Example

Next, a wireless LAN system 900 of a Comparative Example will be described to facilitate the understanding of features of the wireless LAN systems 100 according to the above-described embodiments. Note that the wireless LAN system 900 of the Comparative Example has a system configuration similar to that of the wireless LAN system 100 illustrated in FIG. 1. However, for example, as in the wireless LAN system 100 according to the first embodiment, the wireless LAN system 900 does not perform control such that the AP 101 detects the start or stop of protected communication and the CTS signal control device 104 instructs the interference control signal transmitter 103 to start or stop transmitting a CTS-to-self signal.

The wireless LAN system 900 of the Comparative Example will be described below. However, the wireless LAN system 900 has the same system configuration as those of the wireless LAN systems 100 according to the embodiments illustrated in FIG. 1, and thus description will be given by replacing the wireless LAN system 100 with the wireless LAN systems 900, replacing the AP 101 with an AP 901, replacing the STA 102 with an STA 902, replacing the interference control signal transmitter 103 with an interference control signal transmitter 903, replacing the CTS signal control device 104 with a CTS signal control device 904, and replacing the interfering AP/STA 110 with an interfering AP/STA 910 by using FIG. 1.

In FIG. 1, in the wireless LAN system 900 of the Comparative Example, there is an interfering AP/STA 110 around the AP 901 and the STA 902 that perform wireless LAN communication to be protected, and the AP 901 and the interference control signal transmitter 903 acquire wireless environment information and notify the CTS signal control device 904 of the acquired wireless environment information. The CTS signal control device 904 determines the interfering AP/STA 910 that interferes with the AP 901 and the STA 902, which perform protected communication, on the basis of wireless environment information collected from the AP 901 and the interference control signal transmitter 903, and transmits a scheduling policy for causing the interference control signal transmitter 903 having the interfering AP/STA 910 that causes interference in its communication area to periodically transmit a CTS-to-self signal for a period of time required for the protected communication to the AP 901 and the interference control signal transmitter 903. Then, the interference control signal transmitter 903 periodically transmits the CTS-to-self signal over a period of time required for the protected communication in accordance with the scheduling policy. Here, in a case where the period of time required for the protected communication is equal to or less than a NAV period that can be set to a CTS signal, the CTS-to-self signal is transmitted only once. In a case where the period of time required for the protected communication is longer than the NAV period that can be set to a CTS signal, the CTS-to-self signal is periodically transmitted a plurality of times.

Figure 16:
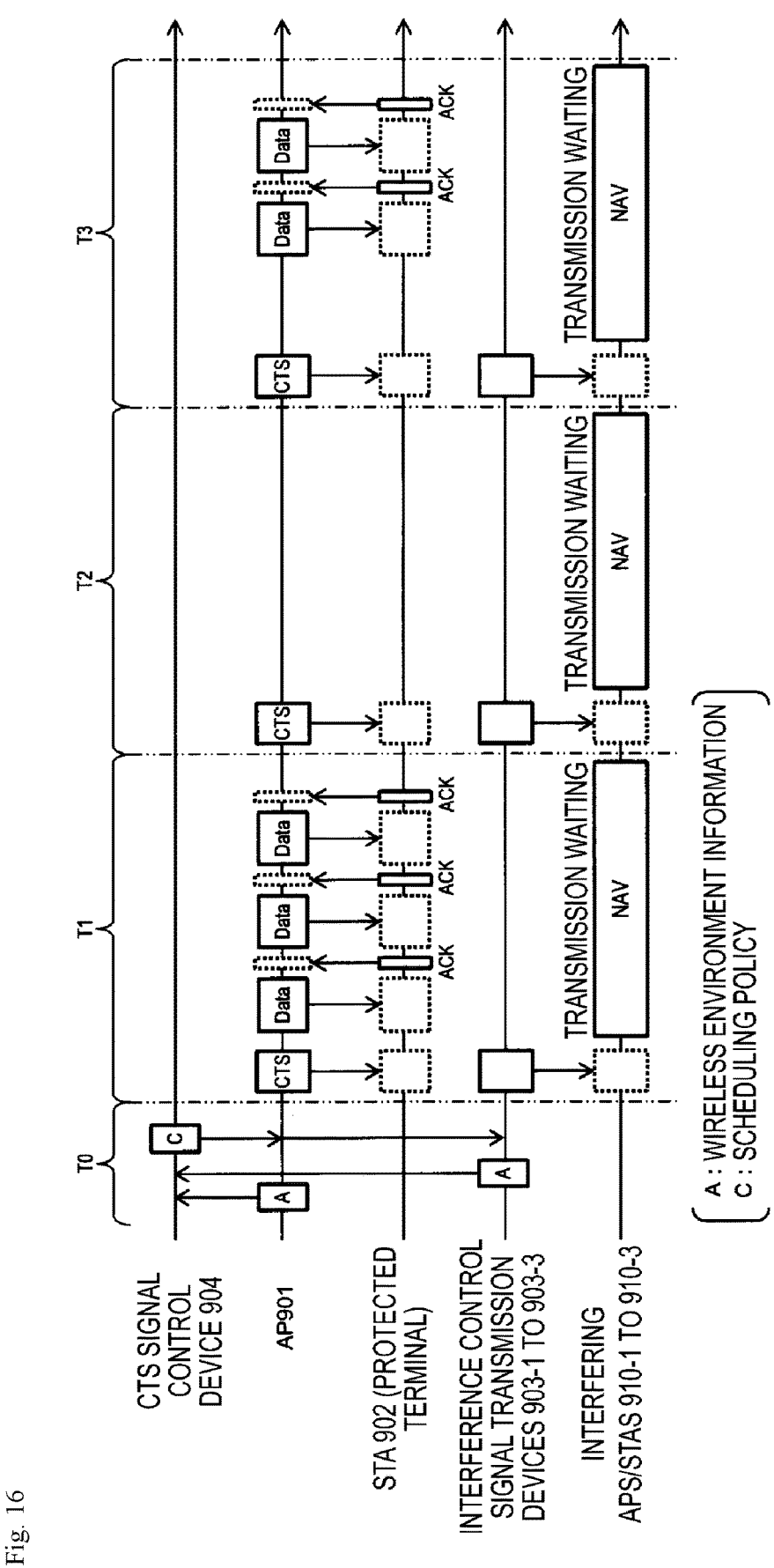
FIG. 16 is a diagram illustrating a control sequence of a wireless LAN system according to a Comparative Example.

FIG. 16 illustrates a control sequence of the wireless LAN system 900 of the Comparative Example. Here, in FIG. 16, A indicates wireless environment information, and C indicates a scheduling policy.

In a period of T0, the CTS signal control device 904 collects wireless environment information from the AP 901 and the interference control signal transmitter 903. Then, the CTS signal control device 904 determines the interfering AP/STA 910 that interferes with the AP 901 and the STA 902, which perform protected communication, on the basis of the wireless environment information. Then, in a case where there is an interfering AP/STA 910 that interferes with the AP 901 and the STA 902 which perform protected communication, the CTS signal control device 904 calculates a period of time required for the protected communication, generates a scheduling policy for causing the interference control signal transmitter 903 that has observed the wireless LAN communication causing interference to transmit a CTS-to-self signal, and transmits the generated scheduling policy to the AP 901 and the interference control signal transmitter 903.

In a period of T1, the AP 901 transmits the CTS-to-self signal to the STA 902 in accordance with the scheduling policy and performs data communication with the STA 902 to be protected. Meanwhile, the interference control signal transmitter 903 transmits the CTS-to-self signal in accordance with the scheduling policy, and makes the transmission of the interfering AP/STA 910 waited for a NAV period.

Also in the following periods of T2 and T3, the AP 901 and the interference control signal transmitter 903 repeatedly and periodically transmit the CTS-to-self signal in accordance with the scheduling policy. Thus, even when protected communication does not occur between the AP 901 and the STA 902 as in the period of T2, the CTS-to-self signal is transmitted from the interference control signal transmitter 903, and thus the interfering AP/STA 910 cannot perform communication. Similarly, even when a period during which protected communication between the AP 901 and the STA 902 is not partially performed as in the period of T3, the interfering AP/STA 910 cannot perform communication. Then, a similar state continues until periodic transmission of the CTS-to-self signal is ended for a period of time required for the protected communication which is designated by the scheduling policy.

In this manner, in the wireless LAN system 900 of the Comparative Example, a period of time required for protected communication according to the scheduling policy which is set by the CTS signal control device 904 is secured, and a CTS-to-self signal is periodically transmitted from the interference control signal transmitter 903 even when the period of time includes a period during which protected communication is not temporarily performed. Thus, the interfering AP/STA 910 cannot perform communication, and there is a problem in that communication efficiency is reduced. In addition, when the number of STAs 902 to be protected increases, the number of times of transmissions of the CTS-to-self signal increases, which leads to a problem in that communication of an STA other than a protection target is suppressed.

On the other hand, in the wireless LAN systems 100 according to the first and the second embodiments described above, protected communication is monitored, the transmission of a CTS-to-self signal is started when the start of the protected communication is detected, and the transmission of the CTS-to-self signal is stopped when the stop of the protected communication is detected. Thus, a period during which protected communication is not performed can be used for communication of the interfering AP/STA 110, and a reduction in communication efficiency can be avoided.

As described above in the embodiments, the wireless LAN system, the interference control signal management device, the base station device, and the interference control method according to the present disclosure can limit the interference of surrounding wireless LAN devices using the same channel and achieve a low delay and a low jitter without reducing communication efficiency.

REFERENCE SIGNS LIST 100, 900 Wireless LAN system
101, 901 AP
102, 902 STA
103, 903 Interference control signal transmitter
104, 904 CTS signal control device
105 Aggregation SW
106 Communication monitoring device
110, 910 Interfering AP/STA
201 Wireless LAN signal transmission and reception unit
202 Communication I/F unit
203 Scheduling unit
204 CTS signal generation unit
205 Traffic monitoring unit
206 CTS signal transmission control unit
301 Wireless LAN signal transmission and reception unit
302 Communication I/F unit
303 Wireless environment information scanning unit
304 CTS transmission control unit
401 Communication I/F unit
402 Wireless environment information collecting unit
403 Protection target setting unit
404 Scheduling policy generation unit
405 CTS signal transmission control unit
501 Communication I/F unit
502 Communication I/F unit
503 Traffic monitoring unit
504 Monitoring target communication setting unit

The invention claimed is:

1. A wireless local area network (LAN) LAN system where an interfering communication device that interferes with wireless LAN communication is present around a base station device and a terminal device that perform the wireless LAN communication, the wireless LAN system comprising:
  an interference control signal transmitter disposed around the base station device and the terminal device, configured to collect wireless environment information, and configured to transmit an interference control signal that causes the interfering communication device to wait for transmission; and
  an interference control signal management device configured to collect the wireless environment information from the base station device and the interference control signal transmitter, set the wireless LAN communication between the base station device that is to be protected and the terminal device that is to be protected as protected communication based on the wireless environment information, determine the interference control signal transmitter around the interfering communication device that interferes with the protected communication, and cause the interference control signal transmitter that is determined to transmit the interference control signal that causes the interfering communication device to wait for transmission,
  wherein the interference control signal management device instructs the interference control signal transmitter to start transmitting the interference control signal when detecting a start of the protected communication and instructs the interference control signal transmitter to stop transmitting the interference control signal when detecting a stop of the protected communication, and
  the base station device and the terminal device preferentially communicate with each other while the interfering communication device with the interference control signal received waits for transmission.

2. The wireless LAN system according to claim 1, wherein detection of the start of the protected communication or the end of the protected communication is performed by the base station device or a communication monitoring device disposed on a route that aggregates pieces of communication of a plurality of the base station devices.

3. The wireless LAN system according to claim 1,
wherein, when there are a plurality of the interference control signal transmitters, the interference control signal management device equalizes transmission waiting period that is set by the interference control signal transmitted from each of the plurality of the interference control signal transmitters and causes the plurality of the interference control signal transmitters to transmit a corresponding plurality of the interference control signals synchronously to each other.

4. The wireless LAN system according to claim 1,
wherein, when there are a plurality of the interference control signal transmitters, the interference control signal management device causes the plurality of the interference control signal transmitters to transmit a corresponding plurality of the interference control signals in sequence and performs control to cause transmission waiting periods that are set by the corresponding plurality of the interference control signals end simultaneously.

5. An interference control signal management device configured to cause an interference control signal transmitter to transmit an interference control signal that causes an interfering communication device to wait for transmission, the interfering communication device being present around a base station device and a terminal device that perform wireless local area network (LAN) communication and interfering with the wireless LAN communication, the interference control signal management device comprising:
a wireless environment information collecting unit configured to collect wireless environment information from the base station device and the interference control signal transmitter;
a protection target setting unit configured to set the wireless LAN communication between the base station device that is to be protected and the terminal device that is to be protected as protected communication based on the wireless environment information and determine the interference control signal transmitter around the interfering communication device that interferes with the protected communication; and
a control unit configured to cause the interference control signal transmitter that is determined to transmit the interference control signal that causes the interfering communication device to wait for transmission,
wherein the control unit instructs the interference control signal transmitter to start transmitting the interference control signal when detecting a start of the protected communication and instructs the interference control signal transmitter to stop transmitting the interference control signal when detecting a stop of the protected communication.

6. A base station device configured to perform wireless local area network (LAN) LAN communication with a terminal device in a wireless environment where an interfering communication device that interferes with the wireless LAN communication is present, the base station device comprising:
a scheduling unit configured to transmit, from a wireless LAN communication unit, an interference control signal generated based on a scheduling policy received from an interference control signal management device;
a monitoring unit configured to receive, from the interference control signal management device, information on protected communication that is to be protected from interference and monitor the wireless LAN communication to detect a start or an end of the protected communication; and
an interference control signal control unit configured to notify the scheduling unit and the interference control signal management device of the start or the end of the protected communication when the monitoring unit detects the start or the end of the protected communication,
wherein the scheduling unit starts transmitting the interference control signal to the terminal device as destination when receiving a notification indicating the start of the protected communication from the interference control signal control unit and stops transmitting the interference control signal when receiving a notification indicating the end of the protected communication from the interference control signal control unit.

* * * * *